US008566478B2

(12) United States Patent
Ota et al.

(10) Patent No.: US 8,566,478 B2
(45) Date of Patent: Oct. 22, 2013

(54) INFORMATION COLLECTING SYSTEM, COMMUNICATION TERMINAL AND INFORMATION COLLECTING METHOD

(75) Inventors: Manabu Ota, Yokosuka (JP); Mitsuru Murata, Yokohama (JP); Mari Akuzawa, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 201 days.

(21) Appl. No.: 13/128,719

(22) PCT Filed: Nov. 5, 2009

(86) PCT No.: PCT/JP2009/068911
§ 371 (c)(1), (2), (4) Date: Jul. 14, 2011

(87) PCT Pub. No.: WO2010/055805
PCT Pub. Date: May 20, 2010

(65) Prior Publication Data

US 2011/0264766 A1 Oct. 27, 2011

(30) Foreign Application Priority Data

Nov. 11, 2008 (JP) ................................ P2008-288811

(51) Int. Cl.
*G06F 15/16* (2006.01)
*G06F 12/00* (2006.01)

(52) U.S. Cl.
USPC ........................................... 709/250; 709/217

(58) Field of Classification Search
USPC .................. 709/203, 217–218, 225–229, 250
See application file for complete search history.

(56) References Cited

U.S. PATENT DOCUMENTS 6,026,303 A * 2/2000 Minamisawa ................ 455/446
8,077,638 B2 * 12/2011 Li et al. ......................... 370/278
2005/0222948 A1 * 10/2005 Sato et al. ....................... 705/40
2008/0009279 A1 * 1/2008 Sakawa ......................... 455/423

FOREIGN PATENT DOCUMENTS

CN 1917707 A 2/2007
CN 1981553 A 6/2007
JP 8-328004 12/1996
JP 9-23283 1/1997

(Continued)

OTHER PUBLICATIONS

Office Action issued May 29, 2012, in Japanese Patent Application No. 2008-288811 with English translation.

(Continued)

*Primary Examiner* — Zarni Maung
(74) *Attorney, Agent, or Firm* — Oblon, Spivak, McClelland, Maier & Neustadt, L.L.P.

(57) ABSTRACT

Information transmission requests are delivered to communication terminals existing in a specific area, to collect information held in the communication terminals, without inducing congestion. In an information collecting device included in an information collecting system, terminal information and capacity information are acquired based on base station identifying information, and information of an information amount of collected information is further acquired based on a collected information type that identifies a type of the collected information. In an information collection controlling unit, transmission timing information, designating the timing at which a capacity of performing communication via a base station is not exceeded, is generated based on the terminal information, the information-amount information and the capacity information, and an information transmission request including the transmission timing information is delivered to a communication terminal.

10 Claims, 14 Drawing Sheets

COLLECTED INFORMATION
INFORMATION COLLECTION REQUEST SIGNAL
{COLLECTED-INFORMATION IDENTIFYING INFORMATION
TRANSMISSION TIMING INFORMATION
COLLECTED-INFORMATION IDENTIFYING INFORMATION
{BASE STATION IDENTIFYING INFORMATION
COLLECTED-INFORMATION TYPE
TERMINAL TYPE
107 COLLECTED INFORMATION ACQUIRING UNIT
106 TRANSMISSION REQUEST DELIVERING UNIT
101 INPUT UNIT
10
100
102 INFORMATION COLLECTION CONTROLLING UNIT
CAPACITY INFORMATION
BASE STATION IDENTIFYING INFORMATION
INFORMATION-AMOUNT INFORMATION
COLLECTED-INFORMATION TYPE
TERMINAL INFORMATION
BASE STATION IDENTIFYING INFORMATION
105 CAPACITY INFORMATION ACQUIRING UNIT
104 INFORMATION AMOUNT ACQUIRING UNIT
103 TERMINAL INFORMATION ACQUIRING UNIT
400 CAPACITY INFORMATION MANAGEMENT SERVER
300 INFORMATION AMOUNT MANAGEMENT SERVER
200 SUBSCRIBER INFORMATION MANAGEMENT SERVER

(56) References Cited

FOREIGN PATENT DOCUMENTS

| | | |
|---|---|---|
| JP | 2002-16976 | 1/2002 |
| JP | 2003-288659 | 10/2003 |
| JP | 2004-297131 | 10/2004 |
| JP | 2007-72208 | 3/2007 |
| JP | 2007-79402 | 3/2007 |
| JP | 2007-87139 | 4/2007 |
| JP | 2007-235224 | 9/2007 |
| JP | 2007-243247 | 9/2007 |
| JP | 2007-323202 | 12/2007 |

OTHER PUBLICATIONS

International Search Report issued Dec. 22, 2009, in PCT/JP2009/068911.

International Preliminary Report on Patentability and Written Opinion issued Jun. 30, 2011, in PCT/JP2009/068911.

"Weather, Climate & Earthquake Information", Japan Meteorological Agency, Oct. 20, 2008, 2 pages http://www.jma.go.jp/jma/indexe.html.

Itsuma Tanaka, et al., "Advanced Warning Message Distribution Platform for the Next-generation Mobile Communication Network", NTT DOCOMO Technical Journal, vol. 11, No. 3, Sep. 2009, 1 front page, pp. 20-26 http://www.nttdocomo.co.jp/english/corporate/technology/rd/technical_journal/bnvol11-3/index.html.

"Disaster Message Board Service", Oct. 20, 2008, 3 pages [http://www.nttdocomo.cojp/english/info/disarter/index.html].

Chinese Office Action issued May 20, 2013, in China Patent Application No. 200980144960.2 (with English translation ).

* cited by examiner

60
COMMUNICATION TERMINAL
2
50
BTS
40
RNC
30
SGN
20
CBS
10
INFORMATION COLLECTION CONTROLLING SYSTEM

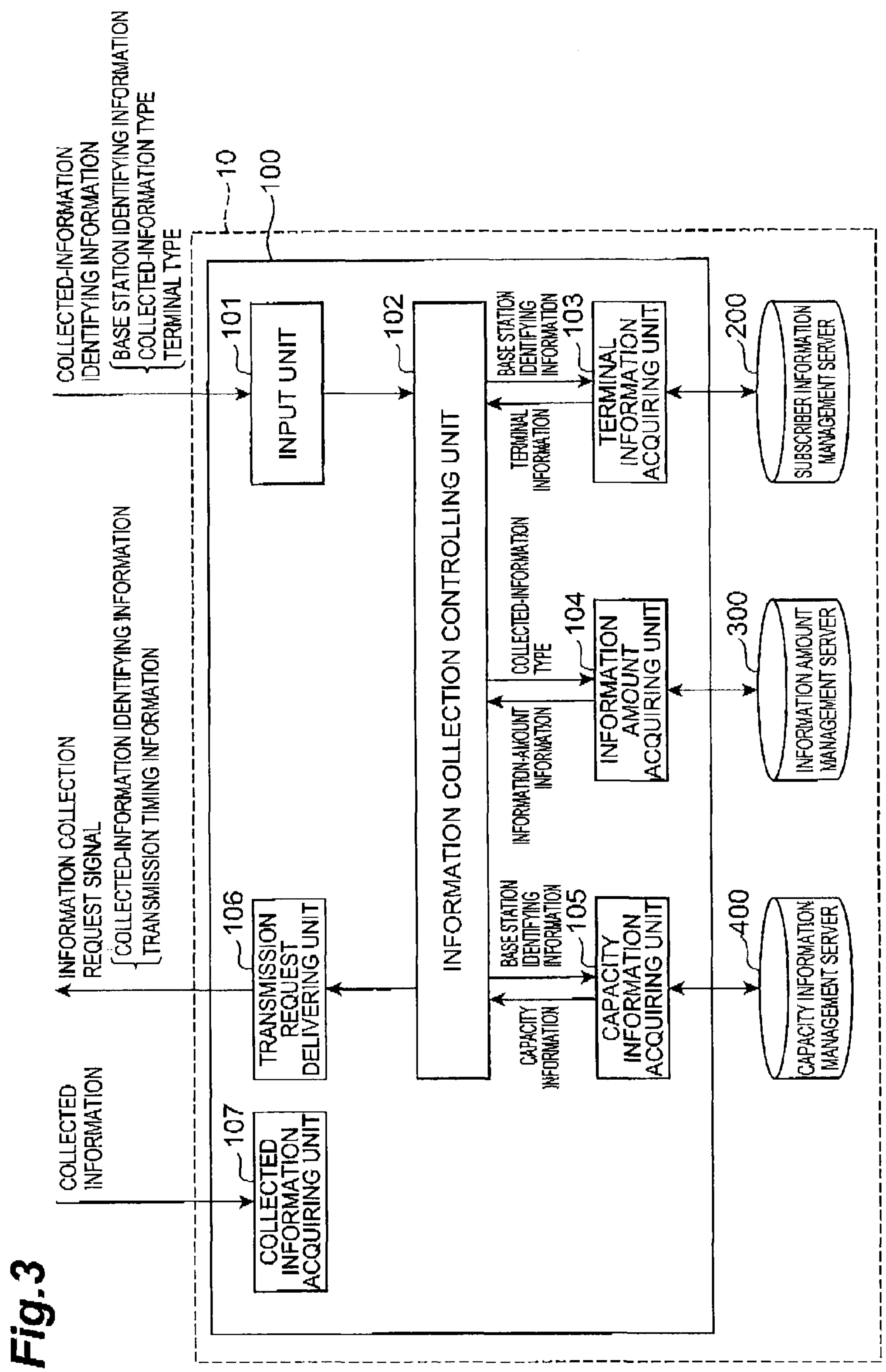
Fig.3
COLLECTED-INFORMATION IDENTIFYING INFORMATION
BASE STATION IDENTIFYING INFORMATION
COLLECTED-INFORMATION TYPE
TERMINAL TYPE
10
100
101
INPUT UNIT
102
INFORMATION COLLECTION CONTROLLING UNIT
BASE STATION IDENTIFYING INFORMATION
103
TERMINAL INFORMATION
TERMINAL INFORMATION ACQUIRING UNIT
200
SUBSCRIBER INFORMATION MANAGEMENT SERVER
COLLECTED-INFORMATION TYPE
104
INFORMATION-AMOUNT INFORMATION
INFORMATION AMOUNT ACQUIRING UNIT
300
INFORMATION AMOUNT MANAGEMENT SERVER
INFORMATION COLLECTION REQUEST SIGNAL
COLLECTED-INFORMATION IDENTIFYING INFORMATION
TRANSMISSION TIMING INFORMATION
106
TRANSMISSION REQUEST DELIVERING UNIT
BASE STATION IDENTIFYING INFORMATION
105
CAPACITY INFORMATION
CAPACITY INFORMATION ACQUIRING UNIT
400
CAPACITY INFORMATION MANAGEMENT SERVER
COLLECTED INFORMATION
107
COLLECTED INFORMATION ACQUIRING UNIT

*Fig.6*

| GROUP | GROUP UNIT (LOWER 4 DIGITS OF PHONE NUMBER) | INFORMATION TRANSMISSION TIMING |
|---|---|---|
| 1 | 0001~2000 | 0 SECOND AFTER RECEPTION |
| 2 | 2001~4000 | 1 MINUTE AFTER RECEPTION |
| 3 | 4001~6000 | 2 MINUTES AFTER RECEPTION |
| 4 | 6001~8000 | 3 MINUTES AFTER RECEPTION |
| 5 | 8001~9999 | 4 MINUTES AFTER RECEPTION |

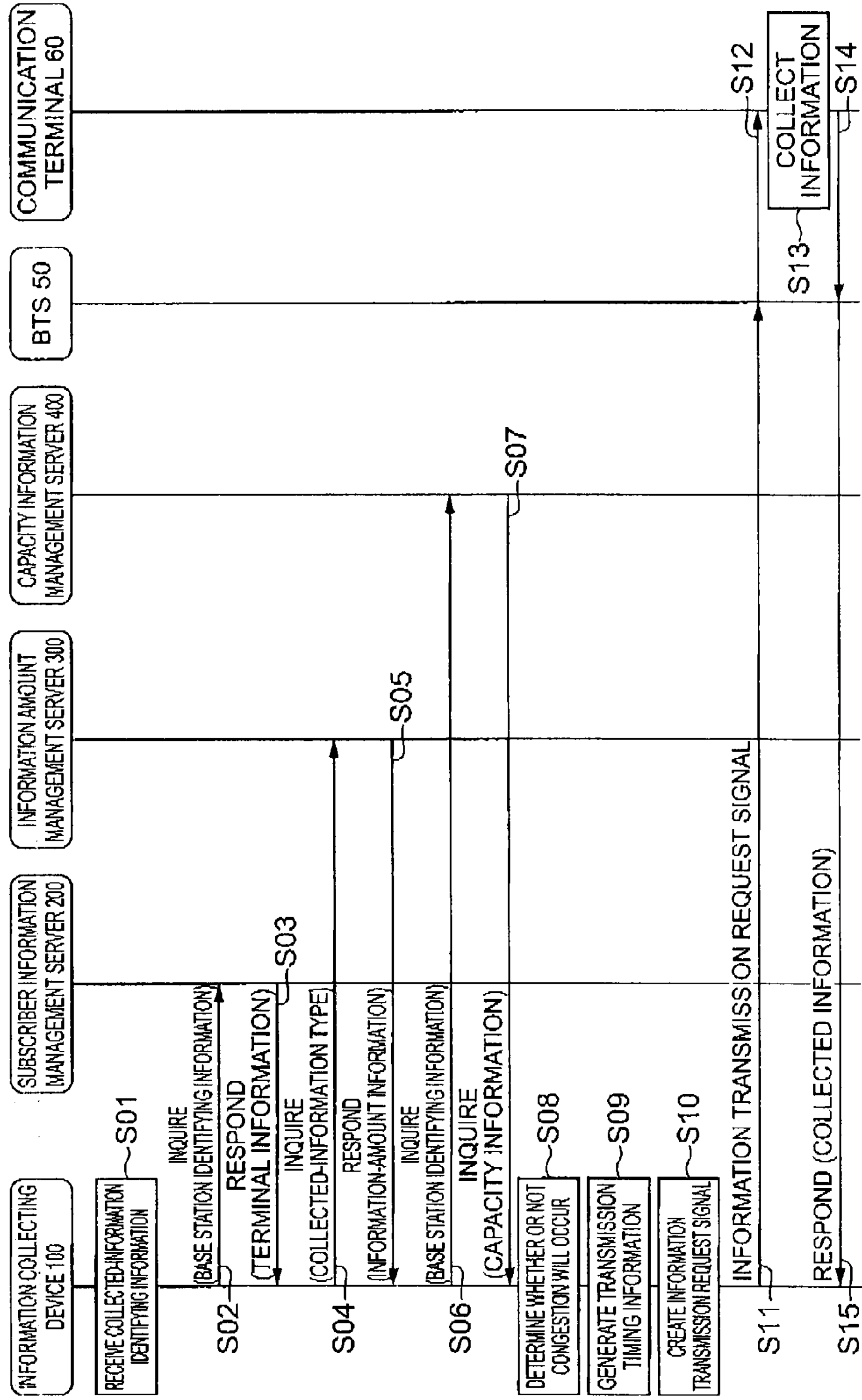
Fig.9
INFORMATION COLLECTING DEVICE 100
SUBSCRIBER INFORMATION MANAGEMENT SERVER 200
INFORMATION AMOUNT MANAGEMENT SERVER 300
CAPACITY INFORMATION MANAGEMENT SERVER 400
BTS 50
COMMUNICATION TERMINAL 60
RECEIVE COLLECTED-INFORMATION IDENTIFYING INFORMATION
S01
INQUIRE (BASE STATION IDENTIFYING INFORMATION)
S02
RESPOND (TERMINAL INFORMATION)
S03
INQUIRE (COLLECTED-INFORMATION TYPE)
S04
RESPOND (INFORMATION-AMOUNT INFORMATION)
S05
INQUIRE (BASE STATION IDENTIFYING INFORMATION)
S06
INQUIRE (CAPACITY INFORMATION)
S07
DETERMINE WHETHER OR NOT CONGESTION WILL OCCUR
S08
GENERATE TRANSMISSION TIMING INFORMATION
S09
CREATE INFORMATION TRANSMISSION REQUEST SIGNAL
S10
INFORMATION TRANSMISSION REQUEST SIGNAL
S11
S12
COLLECT INFORMATION
S13
S14
RESPOND (COLLECTED INFORMATION)
S15

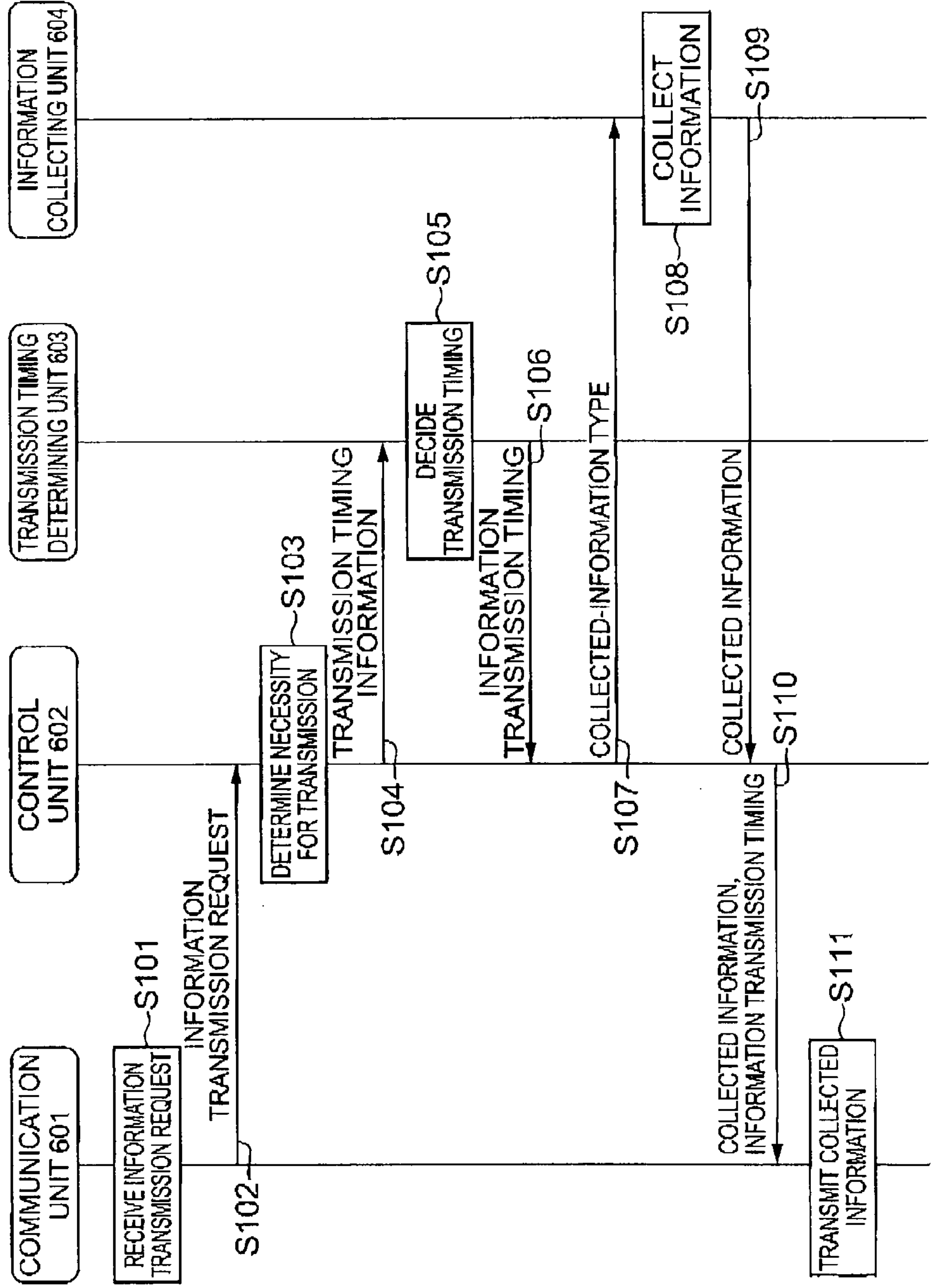
Fig. 10
COMMUNICATION UNIT 601
CONTROL UNIT 602
TRANSMISSION TIMING DETERMINING UNIT 603
INFORMATION COLLECTING UNIT 604
RECEIVE INFORMATION TRANSMISSION REQUEST
S101
INFORMATION TRANSMISSION REQUEST
S102
DETERMINE NECESSITY FOR TRANSMISSION
S103
TRANSMISSION TIMING INFORMATION
S104
DECIDE TRANSMISSION TIMING
S105
INFORMATION TRANSMISSION TIMING
S106
COLLECTED-INFORMATION TYPE
S107
COLLECT INFORMATION
S108
COLLECTED INFORMATION
S109
S110
COLLECTED INFORMATION, INFORMATION TRANSMISSION TIMING
TRANSMIT COLLECTED INFORMATION
S111

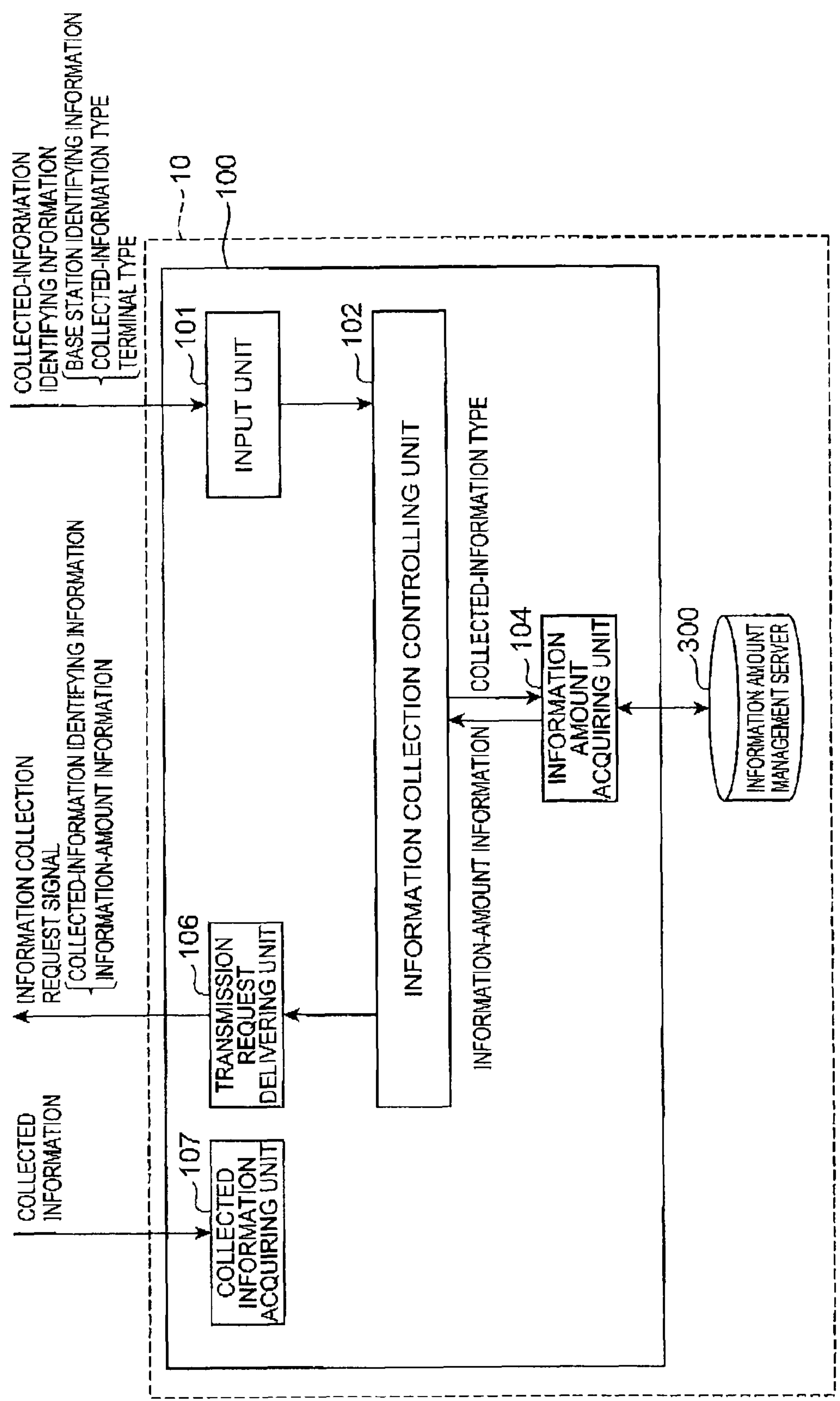
Fig. 11
COLLECTED-INFORMATION IDENTIFYING INFORMATION
BASE STATION IDENTIFYING INFORMATION
COLLECTED-INFORMATION TYPE
TERMINAL TYPE
10
100
101
INPUT UNIT
102
INFORMATION COLLECTION CONTROLLING UNIT
COLLECTED-INFORMATION TYPE
104
INFORMATION AMOUNT ACQUIRING UNIT
300
INFORMATION AMOUNT MANAGEMENT SERVER
INFORMATION-AMOUNT INFORMATION
INFORMATION COLLECTION REQUEST SIGNAL
COLLECTED-INFORMATION IDENTIFYING INFORMATION
INFORMATION-AMOUNT INFORMATION
106
TRANSMISSION REQUEST DELIVERING UNIT
COLLECTED INFORMATION
107
COLLECTED INFORMATION ACQUIRING UNIT 50A
COMMUNICATION TERMINAL
503
AMP
502
BB
501
HWY-INT
RNC
505
NUMBER-OF-TERMINALS STORING UNIT
504
SV
506
TERMINAL CONTROLLING UNIT

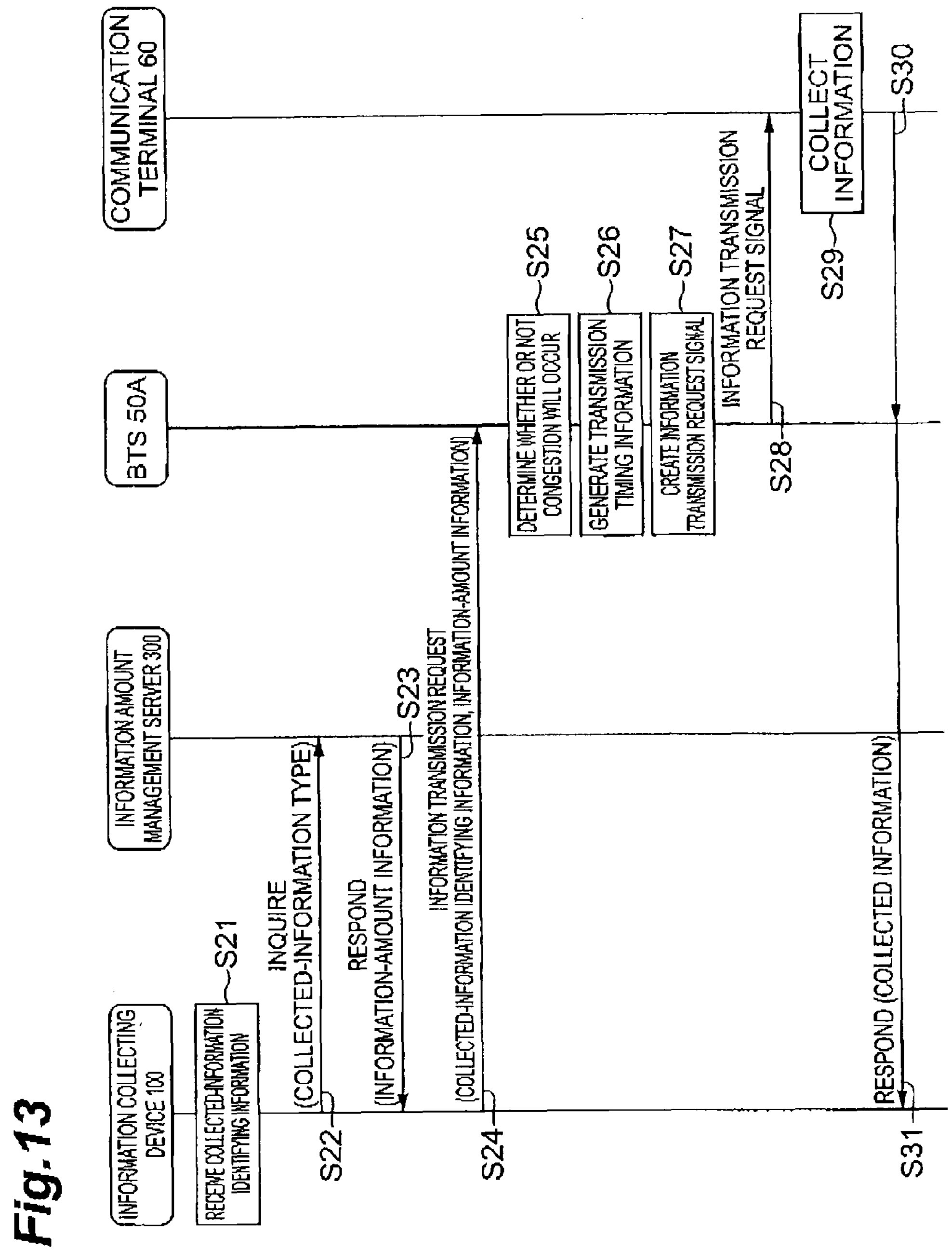
Fig.13
INFORMATION COLLECTING DEVICE 100
INFORMATION AMOUNT MANAGEMENT SERVER 300
BTS 50A
COMMUNICATION TERMINAL 60
RECEIVE COLLECTED-INFORMATION IDENTIFYING INFORMATION
S21
INQUIRE (COLLECTED-INFORMATION TYPE)
S22
RESPOND (INFORMATION-AMOUNT INFORMATION)
S23
INFORMATION TRANSMISSION REQUEST (COLLECTED-INFORMATION IDENTIFYING INFORMATION, INFORMATION-AMOUNT INFORMATION)
S24
DETERMINE WHETHER OR NOT CONGESTION WILL OCCUR
S25
GENERATE TRANSMISSION TIMING INFORMATION
S26
CREATE INFORMATION TRANSMISSION REQUEST SIGNAL
S27
INFORMATION TRANSMISSION REQUEST SIGNAL
S28
COLLECT INFORMATION
S29
S30
RESPOND (COLLECTED INFORMATION)
S31

INFORMATION COLLECTING SYSTEM, COMMUNICATION TERMINAL AND INFORMATION COLLECTING METHOD

TECHNICAL FIELD

The present invention relates to an information collecting system, a communication terminal, and an information collecting method.

BACKGROUND ART

In recent years, there has been provided a 3GPP-standard CBS (Cell Broadcast Service) technique capable of simultaneously delivering messages from a delivery server on a carrier side to communication terminals existing in some specific area (e.g. see Patent Literature 1).

By means of this CBS technique, the service of simultaneously delivering, for example, "a forecast and a warning conforming to a general usage concerning an earthquake motion and a volcanic phenomenon caused by a generated fault motion" (so-called earthquake early warning, see Non Patent Literature 1) which has come to be delivered from the Japan Meteorological Agency due to revision of the Meteorological Service Act, emergency information provided by a municipality or the like, and some other information has been provided by a carrier to communication terminals existing in an area considered to be influenced by the information (e.g. see Non Patent Literature 2). Further, when a disaster or the like occurs, the carrier performs the service of setting up a disaster message board so as to allow communication with people in a disaster area since a vocal call becomes difficult to make due to network congestion (e.g. see Non Patent Literature 3).

CITATION LIST

Patent Literature

Patent Literature 1: Japanese Patent Application Laid-Open No. 2007-323202

Non Patent Literature

Non Patent Literature 1: About Earthquake Early Warning (online), Japan Meteorological Agency (searched on Oct. 20, 2008), Internet <URL: http://www.seisvol.kishou.go.jp/eq/EEW/kaisetsu/index.html>, Non Patent Literature 2: Early Warning "Area Mail" (online), NT T DOCOMO, INC (searched on Oct. 20, 2008), Internet <URL: http://www.nttdocomo.co.jp/service/anshin/areamail/>;

Non Patent Literature 3: I-Mode Message Service for Disaster (online), NTT DOCOMO, INC (searched on Oct. 20, 2008), Internet <URL: http://www.nttdocomo.co.jp/info/disaster/>

SUMMARY OF INVENTION

Technical Problem

There have been conducted studies on a technique for collecting information, held by communication terminals existing in a specific area, from the communication terminals by means of the CBS technique. Specifically, it is a method in which signals requesting transmission of information are simultaneously delivered from a delivery server to communication terminals existing in a specific area, information held by their own terminals is transmitted to the delivery server in the communication terminals upon reception of the signals, and thereby information from the communication terminals existing in the specific area is collected in the delivery server.

However, as described above, when the signals requesting transmission of information are simultaneously delivered to the communication terminals and all the communication terminals existing in the specific area simultaneously respond to the signals, congestion might occur.

The present invention was made in view of the above, and has an object to provide an information collecting system, a communication terminal and an information collecting method, which are capable of delivering information transmission requests to communication terminals existing in a specific area, to collect information held in the communication terminals, without inducing congestion.

Solution to Problem

In order to achieve the above object, an information collecting device according to the one aspects of the present invention is an information collecting system which collects collected information as information held in a plurality of communication terminals existing in a serving area under a specific base station via a mobile communication network, the system comprising: an information receiving unit for receiving base station identifying information as information identifying the base station, and a collected-information type as information identifying the type of the collected information; a terminal information acquiring unit for acquiring terminal information that includes information representing the number of communication terminals for which the collected information is collected, based on the base station identifying information; an information amount acquiring unit for acquiring information-amount information according to an information amount of information identified by the collected-information type, based on the collected-information type; a capacity information acquiring unit for acquiring capacity information as information according to a capacity of performing communication via the base station, based on the base station identifying information; an information collection controlling unit for generating transmission timing information that designates the timing at which the plurality of communication terminals transmits the collected information, based on the terminal information, the information-amount information and the capacity information; a transmission request creating unit for creating an information transmission request that includes the transmission timing information and the collected-information type; and a transmission request delivering unit for delivering the information transmission requests to the plurality of communication terminals.

Further, the other aspects of the present invention is that an information collecting method by unit of an information collecting system which collects collected information held in a plurality of communication terminals existing in a serving area under a specific base station via a mobile communication network, the method comprising: an information receiving step in which an information receiving unit of the information collecting system receives base station identifying information as information identifying the base station, and a collected-information type as information identifying the type of the collected information; a terminal information acquiring step in which a terminal information acquiring unit of the information collecting system acquires terminal information that includes information representing the number of communication terminals for which the collected information is collected, based on the base station identifying information; an information amount acquiring step in which an information amount acquiring unit of the information collecting system acquires information-amount information according to an information amount of information identified by the collected-information type, based on the collected-information type; a capacity information acquiring step in which a capacity information acquiring unit of the information collecting system acquires capacity information as information according to a capacity of performing communication via the base station, based on the base station identifying information; an information collection controlling step in which an information collection controlling unit of the information collecting system generates transmission timing information that designates the timing at which the plurality of communication terminals transmits the collected information, based on the terminal information, the information-amount information and the capacity information; a transmission request creating step in which a transmission request creating unit of the information collecting system creates an information transmission request that includes the transmission timing information and the collected-information type; and a transmission request delivering step in which a transmission request delivering unit of the information collecting system delivers the information transmission requests to the plurality of communication terminals.

According to the information collecting system and the information collecting method, the terminal information and the capacity information are acquired based on the base station identifying information, and the information of the information amount of the collected information is further acquired based on the collected information type that identifies a type of the collected information. Moreover, the transmission timing information that designates the timing at which a capacity of performing communication via a base station is not exceeded can be generated based on the terminal information, the information-amount information and the capacity information, and the information transmission request including the transmission timing information is delivered to the communication terminal. In this manner, by designating the timing, at which a plurality of communication terminals existing in a serving area under the base station responds to the delivered information transmission requests, it is possible to prevent simultaneous reply of the plurality of terminals under the base station, so as to suppress induction of congestion due to an increased communication amount.

Herein, it can be embodied such that the information receiving unit further acquires a terminal type as information identifying a type of the communication terminal that collects the collected information, the information collection controlling unit generates the transmission timing information based on the terminal information, the information-amount information, the capacity information and the terminal type, and the transmission request creating unit creates an information transmission request including the transmission timing information, the terminal type and the collected-information type.

As thus described, delivering the information transmission requests with the terminal type that identifies the type of the communication terminal included in the requests to the communication terminals existing in a service area under the base station can collect a response only from the communication terminal of a specific type in the information collecting system out of the plurality of communication terminals existing in a service area under the base station, and whereby it is possible to collect information in accordance with more detailed conditions, while deterring reply from a communication terminal not desired to reply, so as to suppress a communication amount generated at the time of collecting information.

Further, it can be also embodied such that the information collection controlling unit determines, based on the terminal information, the information-amount information and the capacity information, whether or not communication beyond the capacity will occur when the plurality of communication terminals simultaneously transmits the collected information to the information collecting system, and generates the transmission timing information when determining that the capacity will be exceeded, while stopping generation of the transmission timing information when determining that the capacity will not be exceeded, and the transmission request creating unit eliminates the transmission timing information from the information transmission request when the information collection controlling unit determines that the capacity will not be exceeded.

As thus described, the necessity for creating the transmission timing information is determined based on whether or not communication beyond the capacity will occur when the communication terminals that exist under the base station simultaneously transmit collected information, and whereby it is possible to reduce processing according to creation of the transmission timing information performed by the information collection controlling unit, while reducing the information amount included in the information transmission requests that are delivered to the plurality of communication terminals.

Herein, the transmission timing information, created by the information collecting system capable of collecting information while suppressing induction of congestion, can be specifically information that designates a different timing for each of a plurality of groups into which the plurality of communication terminals is sorted using the information respectively identifying the plurality of communication terminals. Further, it can be also embodied such that the transmission timing information is information that designates, by unit of an arbitrary time width, the timing at which the plurality of communication terminals transmits the collected information.

Moreover, the above object can also be achieved when the information collecting system further includes the base station. That is, the information collecting system according to the one aspects of the present invention further includes the base station, wherein the base station includes a number-of-terminals information holding unit for holding number-of-terminals information indicating the number of communication terminals existing in a serving area under its own station, to transmit the number-of-terminals information according to a number-of-terminals transmission request from the terminal information acquiring unit that requests transmission of the number-of-terminals information, and the terminal information acquiring unit transmits the number-of-terminals transmission request to the base station identified by the base station identifying information, thereby to acquire the number-of-terminals information transmitted from the base station as the terminal information.

As thus described, the terminal information acquiring unit acquires information indicating the number of communication terminals existing in a serving area held by the base station as the number-of-terminals information, and it is thus possible to acquire the number-of-terminals information by performing communication with the base station, so as to efficiently acquire the number-of-terminals information.

Moreover, this information collecting system further includes: a terminal information storage device that stores the base station identifying information and the terminal information in association with each other; an information-amount information storage device that stores the collected-information type and the information-amount information in association with each other; and a capacity information storage device that stores the base station identifying information and the capacity information in association with each other, wherein the terminal information acquiring unit acquires the terminal information from the terminal information storage device, the information amount acquiring unit acquires the information-amount information from the information-amount information storage device, and the capacity information acquiring unit acquires the capacity information from the capacity information storage device. In this manner, the configuration may be formed including the terminal information storage device, the information-amount information storage device and the capacity information storage device.

Further, as another configuration as the information collecting system that achieves the above object, it can be also embodied such that information collecting system comprises a specific base station and an information collecting device that collects collected information as information held in a plurality of communication terminals existing in a serving area under the base station via a mobile communication network, wherein the information collecting device includes: an information receiving unit for receiving base station identifying information as information identifying the base station, and a collected-information type as information identifying the type of the collected information; an information amount acquiring unit for acquiring information-amount information according to an information amount of information identified by the collected-information type, based on the collected-information type; a transmission request creating unit for creating an information transmission request that includes the information-amount information and the collected-information type; and a transmission request transmitting unit for transmitting the information transmission request to the base station, and wherein the base station includes: a transmission request receiving unit for receiving the information transmission request transmitted from the information collecting device; a number-of-terminals information holding unit for holding number-of-terminals information indicating the number of communication terminals existing in a serving area under its own station; a transmission timing information generating unit which determines, based on the information-amount information included in the information transmission request and the number-of-terminals information held by the number-of-terminals information holding unit, whether or not communication beyond the capacity will occur when the plurality of communication terminals simultaneously transmits the collected information to the information collecting device, and which generates the transmission timing information when determining that the capacity will be exceeded, and stops generation of the transmission timing information when determining that the capacity will not be exceeded; and an information transmission request delivering unit for delivering the information transmission requests attached with the transmission timing information to the plurality of communication terminals.

With the above embodiment, for example when the information transmission requests are delivered from the information collecting device to the plurality of base stations, transmission timing information for use at the time of delivery from each base station to the communication terminals in its own serving area is generated in each base station. For this reason, as compared with a case where one information collecting device performs processing for generating the transmission timing information, the processing is performed parallely in a distributed manner by the plurality of base stations, thereby allowing reduction in processing time taken for the processing.

Moreover, this information collecting system further includes an information-amount information storage device that stores the collected-information type and the information-amount information in association with each other, and the information amount acquiring unit acquires the information-amount information from the information-amount information storage device. In this manner, the configuration may be formed including the information-amount information storage device.

Further, a communication terminal according to the one aspects of the present invention is a communication terminal which transmits collected information held in the communication terminal to an information collecting system based on an information transmission request delivered from the information collecting system, the terminal comprising: a reception unit for receiving the information transmission request including a collected-information type that is delivered from the information collecting system and identifies the type of the collected information and transmission timing information as information that designates the timing at which the collected information is transmitted; an information creating unit for creating the collected information including information identified by the collected-information type; a transmission timing determining unit for determining the timing at which the collected information is transmitted based on the transmission timing information; and an information transmitting unit for transmitting the collected information to the information collecting system at the timing determined by the transmission timing determining unit.

According to the above communication terminal, the timing at which transmission is performed from the communication terminal to the information collecting system is decided based on the transmission timing information transmitted from the information collecting system, and at that timing, information held in the communication terminal is transmitted as the collected information. In this manner, by transmitting the collected information in accordance with the transmission timing information set by the information collecting system, information transmitted from the communication terminal based on the information transmission request can be collected in the information collecting system.

Herein, it can be also embodied such that the transmission timing determining unit decides, by use of a random number calculated from the communication terminal, the timing at which the communication terminal transmits the collected information within an arbitrary time width when the timing is described in terms of the lime width in the transmission timing information.

As described above, when the transmission timing information is described in terms of an arbitrary time width, the timing is decided by use of a random number calculated in the communication terminal, whereby it is possible to avoid concentration of the timing, at which the communication terminals transmit the collected information within the time width, on specific timing, so as to suppress occurrence of congestion.

Further, it can be also embodied such that the reception unit receives the information transmission request further including, a terminal type as information that identifies a type of the communication terminal which collects the collected information, and the information transmitting unit refers to the terminal type, and transmits the collected information to the information collecting system when determining that the communication terminal needs to transmit the collected information.

As thus described, with the embodiment that the communication terminal determines whether or not to transmit collected information from the communication terminal to the information collecting system based on the terminal type, it is possible to deter transmission of transmission information from the communication terminal for which information is not collected in the information collecting system, so as to suppress an amount of communication generated at the time of collecting information.

Advantageous Effects of Invention

According to the present invention, there are provided an information collecting system, a communication terminal and an information collecting method, which are capable of delivering information transmission requests to communication terminals existing in a specific area, to collect information held in the communication terminals, without inducing congestion.

BRIEF DESCRIPTION OF THE DRAWINGS

FIG. 3 is a block diagram illustrating a configuration of an information collection controlling system according to a first embodiment;

FIG. 6 is a diagram showing an example of a transmission timing information created in an information collection controlling unit of the information collecting device;

FIG. 9 is a sequence diagram illustrating a method of information collection by the communication system according to the first embodiment;

FIG. 10 is a sequence diagram illustrating a method of information collection by the communication terminal included in the communication system according to the first embodiment;

FIG. 11 is a block diagram illustrating a configuration of an information collection controlling system according to a second embodiment;

FIG. 13 is a sequence diagram illustrating a method of information collection by the communication system according to the second embodiment.

DESCRIPTION OF EMBODIMENTS

Hereinafter, a best mode for implementing the present invention will be described in detail with reference to attached drawings. It is to be noted that the same elements will be provided with the same numerals in descriptions of the drawings, and duplicated descriptions will be omitted.

First Embodiment

Configuration of Communication System According to First Embodiment

A communication system including an information collecting system according to a first embodiment of the present invention will be described using FIGS. 1 to 3.

Figure 1:
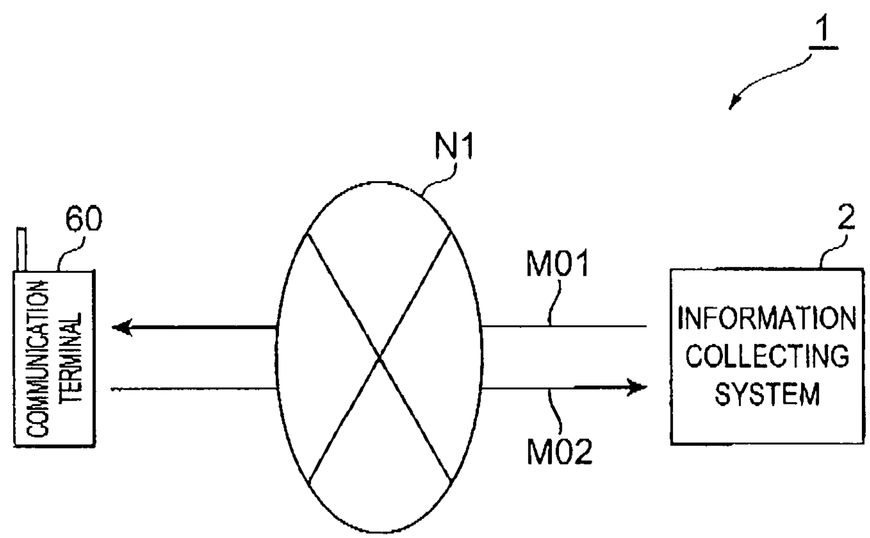
FIG. 1 is a diagram showing a relation between an information collecting system included in a communication system and a communication terminal for which information is collected by the information collecting system.

FIG. 1 is a diagram showing a relation between an information collecting system 2 included in a communication system 1, and a communication terminal 60 for which information is collected by the information collecting system 2. As shown in FIG. 1, by means of the CBS (Cell Broadcast Service) technique, an information collection request signal M01 (information transmission request signal) is transmitted from the information collecting system 2 to the communication terminal 60 via a mobile communication network N1. In response to this, in the communication terminal 60, collection of information is requested by the information collection request signal, and information held in the communication terminal 60 is collected and transmitted as collected information M02. This collected information is received by the information collecting system 2, and thereby the information is collected in the information collecting system 2. This mobile communication network N1 is a network provided by a carrier for the communication terminal 60 to perform packet communication. It is to be noted that, although one communication terminal 60 is in FIG. 1, the communication terminals 60 each for which information is collected by the information collecting system 2 are actually a plurality of communication terminals existing in a specific area. In the following description of the embodiment, a description will be given using one communication terminal 60 existing in a serving area under a specific base station out of the plurality of communication terminals.

The information collection request signal M01 (information transmission request signal) that is transmitted from the information collecting system 2 to the communication terminal 60 will be described here. The information collection request signal M01 includes information (collected-information type) showing a type of information requesting transmission from the communication terminal 60, transmission timing information designating a transmission timing of the information, and information (terminal type) identifying a type of the communication terminal 60 requesting transmission of the information. Out of these, the collected-information type is information showing a type of information the information collection controlling system 10 intends to collect. Examples of information collected in the information collection controlling system 10 include setting information of the communication terminal 60, contents held by the communication terminal 60, and information that can be acquired from a variety of sensors provided in the communication terminal 60, such as positional information, moisture and a temperature. Further, the transmission timing information is information that designates the timing at which information designated by the collected-information type is transmitted from the communication terminal 60 to the information collecting system 2. Moreover, the terminal type is information showing the type of the communication terminal 60 that requires transmission of information. Examples of the terminal type of the communication terminal 60 include a manufacture type and a model type of the communication terminal 60, and types of functions the communication terminal 60 holds, such as one-segment and WLAN (Wireless LAN). This terminal type is information included in the information collection request signal M01 (information transmission request signal), and for example when information regarding a specific function that the communication terminal 60 has is collected, information can be collected only from the communication terminal 60 having the function by making types of functions of the communication terminal 60 as the terminal type included in the information collection request signal M01 (information transmission request signal).

Further, the collected information M02 transmitted from the communication terminal 60 to the information collecting system 2 is information collected in the communication terminal 60 based on the collected-information type included in the above information collection request signal M01. This collected information M02 is transmitted from the communication terminal 60 to the information collecting system 2 at the timing designated by the transmission timing information included in the information collection request signal M01. The specific method thereof will be described below.

Figure 2:
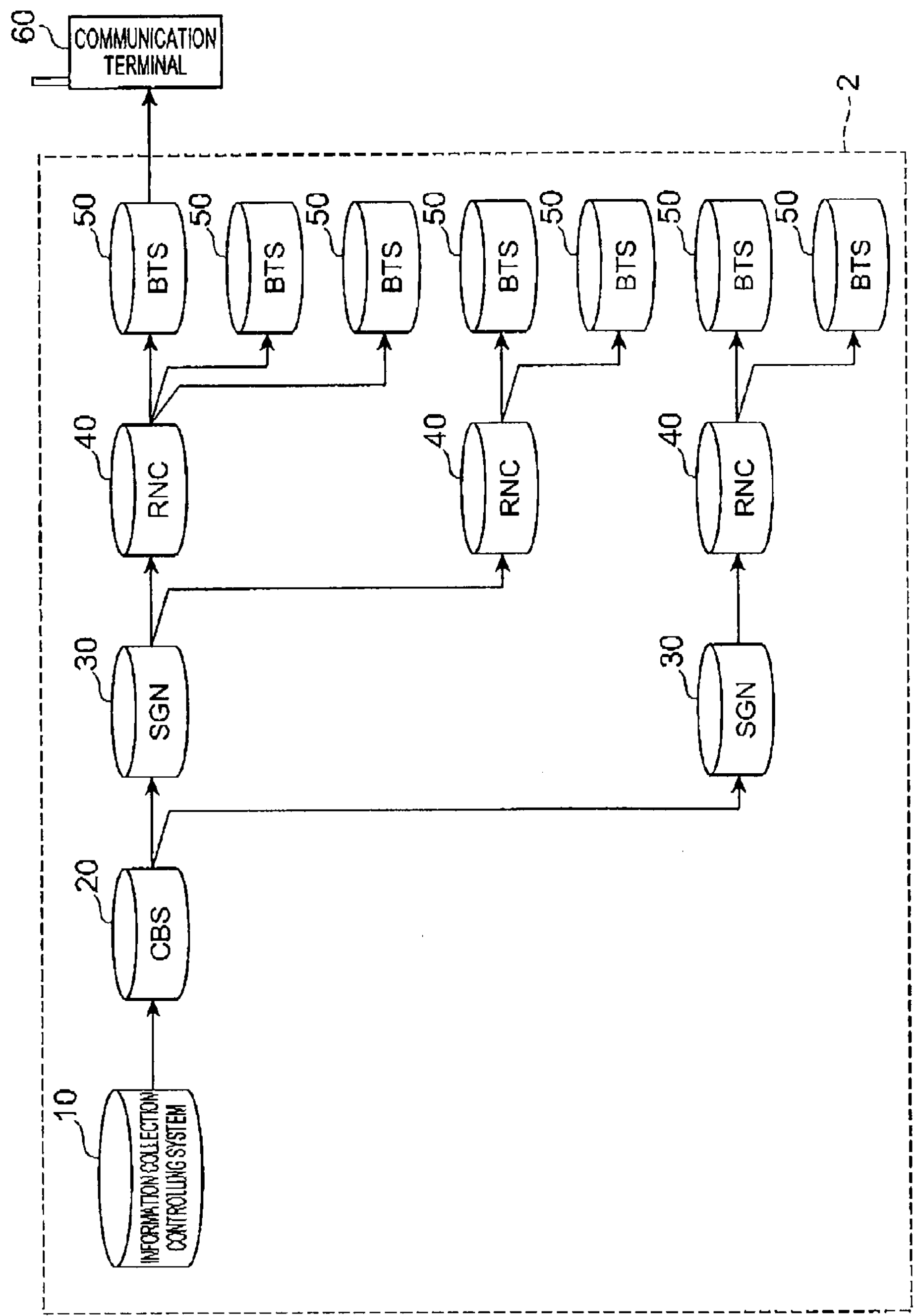
FIG. 2 is a block diagram more specifically illustrating a configuration of each device included in the communication system.

FIG. 2 is a diagram more specifically illustrating a configuration of each device included in the communication system 1. As shown in FIG. 2, the communication system 1 is configured including the information collection controlling system 10 which is included in the information collecting system 2, a CBS (Cell Broadcast Service) 20, an SGSN (Service General Pace Radio Service Support Node) 30, an RNC (Radio Network Controller) 40, and a BTS (Base Transceiver Station) 50. These devices are provided by a carrier N, and a mobile communication network N1 is configured by these devices functioning as described below. It should be noted that as shown in FIG. 2, the plurality of SGSNs 30 is connected to the CBS 20, and the RNCs 40 are connected to the respective SGSNs 30. Further, a plurality of BTSs 50 is connected to each of the RNCs 40. The communication terminal 60 is connected to one of the plurality of BTSs 50, thereby to have a function to perform communication via the mobile communication network N1.

Delivery of information performed by the CBS 20 will be described here. This delivery of information performed by the CBS 20 is not transmission of information with a communication terminal of an opposite party designated, but simultaneous delivery of information to a plurality of communication terminals existing in a specific area. This simultaneous delivery of information is performed regarding, for example, the BTS 50 being a wireless base station device as a unit. That is, designating the BTS 50 leads to simultaneous delivery of information to the communication terminals existing in a specific area in which the BTS 50 performs communication control. In this manner, in the simultaneous delivery of information performed by the CBS 20, information delivery is performed not identifying the communication terminals 60, but identifying only the area in which the communication terminals 60 exist, and hence it is for example applied to delivery of an earthquake early warning which is important particularly for a specific area, and the like.

It is to be noted that information is exchanged between the communication terminal 60 and the BTS 50 by wireless communication via the mobile communication network N1. Further, connections are made between the information collection controlling system 10 and the CBS 20, between the CBS 20 and the SGSN 30, between the SGSN 30 and the RNC 40, and between the RNC 40 and the BTS 50, via respective wired networks.

As described above, the information collection controlling system 10 has the function of creating an information collection request signal to be transmitted to the communication terminal 60 and transmitting the signal to the CBS 20, so as to simultaneously deliver the signals to the communication terminals 60. FIG. 3 is a block diagram illustrating a configuration of the information collection controlling system 10. As shown in FIG. 3, the information collection controlling system 10 is configured including an information collecting device 100, a subscriber information management server 200 (terminal information storage device), an information amount management server 300 (information-amount information storage device), and a capacity information management server (capacity information storage device) 400. The information collecting device 100 has a function of receiving collected-information identifying information created by the carrier, a third party or the like, and generates transmission timing information based on this collected-information identifying information, to create an information transmission request signal including the collected-information identifying information and the transmission timing information. In addition, this collected-information identifying information is information that identifies the communication terminal 60 for which information is collected and information collected from the communication terminal 60. Specifically, the collected-information identifying information includes base station identifying information that identifies the BTS 50 to perform communication control of an area for which information is collected, a collected-information type and a terminal type. The subscriber information management server 200, the information amount management server 300 and the capacity information management server 400 are servers respectively storing information for use in creating transmission timing information included in the information transmission request signal.

Figure 4:
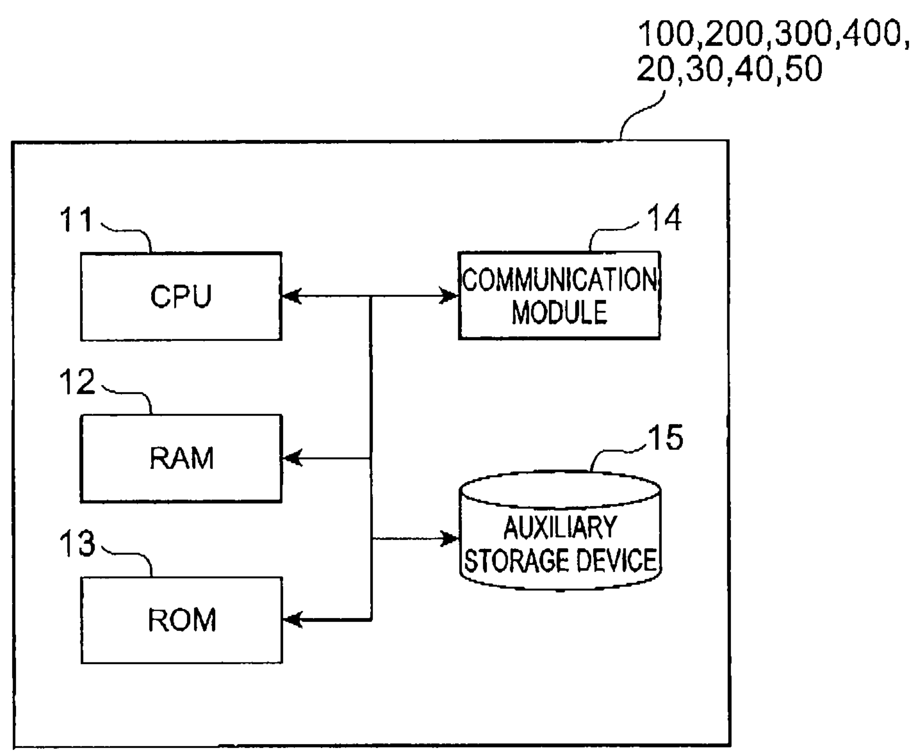
FIG. 4 is a diagram showing a hardware configuration of an information collecting device, a subscriber information management server, an information amount management server, a capacity information management server, a CBS, an SGSN, an RNC and a BTS.
Figure 5:
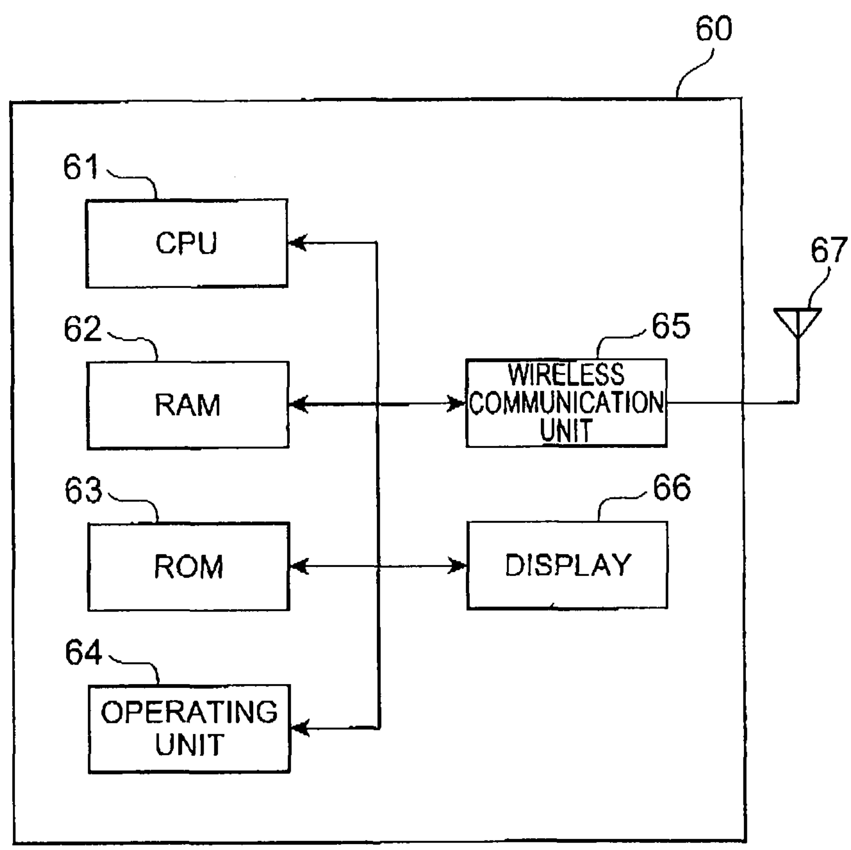
FIG. 5 is a diagram showing a hardware configuration of the communication terminal.

As shown in FIG. 4, the information collecting device 100, the subscriber information management server 200, the information amount management server 300, the capacity information management server 400, the CBS 20, the SGSN 30, the RNC 40 and the BTS 50 which are included in the information collection controlling system 10 are configured as a computer having hardware such as a CPU 11, an RAM (Random Access Memory) 12 and an ROM (Read Only Memory) 13 as main storage devices, a communication module 14 for performing communication, and an auxiliary storage device 15 like a hard disk. Operations of these constitutional elements exert after-mentioned functions of the respective devices. Further, connections are made between the information collecting device 100 and the subscriber information management server 200, between the information collecting device 100 and the information amount management server 300, and between the information collecting device 100 and the capacity information management server 400, via respective wired networks Further, the communication terminal 60 is a communication terminal used by an owner (user) of each communication terminal. Specifically, it is realized as a device having a communication function, such as a mobile phone or a PDA (personal Digital Assistance). Moreover, as shown in FIG. 5, this communication terminal is made up of hardware such as a CPU (Central Processing Unit) 61, an RAM 62, an ROM 63, an operating unit 64, a wireless communication unit 65, a display 66, and an antenna 67. Operations of these constitutional elements exert after-mentioned functions of the communication terminal 60.

Subsequently, returning to FIG. 3, a function of each device constituting the information collection controlling system 10 will be described. First, the information collecting device 100 included in the information collection controlling system 10 is configured including an input unit (information receiving means) 101, an information collection controlling unit (information collection controlling means, transmission request creating means) 102, a terminal information acquiring unit (terminal information acquiring means) 103, an information amount acquiring unit (information amount acquiring means) 104, a transmission request delivering unit (transmission request delivering means) 106, and a collected information acquiring unit 107. It is to be noted that, although the information collecting device 100 having each of the above means will be described in the present embodiment, each of the above means is not necessarily included in the same device. For example, the terminal information acquiring unit 103, the information amount acquiring unit 104 and the capacity information acquiring unit 105 may be located in the same places as the subscriber information management server 200, the information amount management server 300 and the capacity information management server 400, respectively, and those may be located in a places apart from the information collection controlling unit 102.

The input unit 101 functions as the information receiving means for receiving collected-information identifying information including base station identifying information, a collected-information type and a terminal type. The above information is provided by an operation of the information collecting device 100 by a content provider who provides contents to the communication terminal 60, or the like, other than the carrier managing the information collection controlling system 10, and received in the input unit 101. The above information received in the input unit 101 is transmitted to the information collection controlling unit 102.

The information collection controlling unit 102 has a function of instructing the after-mentioned terminal information acquiring unit 103, information amount acquiring unit 104 and capacity information acquiring unit 105 to acquire information by use of the base station identifying information, the collected-information type and the terminal type transmitted from the input unit 101. The information collection controlling unit 102 functions as the information collection controlling means for generating transmission timing information based on information acquired by the terminal information acquiring unit 103, the information amount acquiring unit 104 and the capacity information acquiring unit 105. This information collection controlling unit 102 also functions as the transmission request creating means for creating an information transmission request signal including the transmission timing information, the collected-information type and the terminal type.

Specifically, first, base station identifying information is transmitted from the information collection controlling unit 102 to the terminal information acquiring unit 103, to instruct acquisition of terminal information according to communication terminals existing in a serving area under the base station device (BTS 50) identified by the base station identifying information. This terminal information includes information representing the number of communication terminals existing in the serving area of the specific BTS 50 and contract information of the communication terminal existing in the area. In the terminal information acquiring unit 103, an inquiry is made to the subscriber information management server 200 in accordance with the instruction of the information collection controlling unit 102, thereby to acquire terminal information. That is, the terminal information acquiring unit 103 functions as the terminal information acquiring means.

The subscriber information management server 200 to which an inquiry is made by the terminal information acquiring unit 103 is a device that functions as an HLR (Home Location Register) holding information according to the communication terminals which are connected to the mobile communication network N1 and perform communication. Information held in the subscriber information management server 200 is updated, for example, based on location registration processing which is performed at the time of changing the BTS 50 connected with the communication terminal 60, and the like. In the subscriber information management server 200, information held in its own server is referred to based on the base station identifying information transmitted from the terminal information acquiring unit 103, and terminal information is transmitted to the terminal information acquiring unit 103, the terminal information including the number of terminals existing in the area of the BTS 50 identified by the base station identifying information, information according to a contractor of the terminal, information according to the communication terminal, and the like. The terminal information transmitted from the subscriber information management server 200 is acquired in the terminal information acquiring unit 103, and transmitted to the information collection controlling unit 102.

Next, the information amount acquiring unit 104 will be described. To the information amount acquiring unit 104, the collected-information type is transmitted from the information collection controlling unit 102, to instruct acquisition of an information amount corresponding to the collected-information type. In the information amount acquiring unit 104, an inquiry about an information amount is made to the information amount management server 300 based on this collected information type, thereby to acquire an amount of information to be transmitted from the information amount management server 300. That is, the information amount acquiring unit 104 functions as the information amount acquiring means.

The information amount management server 300 to which an inquiry is made by the information amount acquiring unit 104 is a device that holds an amount of information generated at the time of acquiring information designated by the collected-information type from the communication terminal 60. For example when the collected-information type is "location information", latitude/longitude information is used as information to be acquired from the communication terminal 60. The information amount management server 300 has a function of holding the information amount transmitted from the communication terminal 60 in association with the collected-information type when acquiring latitude/longitude information from the communication terminal 60. Information held in this information amount management server 300 is stored into the information amount management server 300 when the carrier previously inputs information amount information with respect to information considered to be collected from the communication terminal 60. In the information amount management server 300, based on the collected-information type transmitted from the information amount acquiring unit 104, an information amount when acquiring from the communication terminal 60 information identified by the collected-information type is notified to the information amount acquiring unit 104. Thereby, the information-amount information corresponding to the terminal type is acquired in the information amount acquiring unit 104, and transmitted to the information collection controlling unit 102.

Next, the capacity information acquiring unit 105 will be described. To the capacity information acquiring unit 105, base station identifying information is transmitted from the information collection controlling unit 102, to instruct acquisition of information (capacity information) according to a capacity of communication performed by the base station device (BTS 50) identified by the base station identifying information. In the capacity information acquiring unit 105, an inquiry about a capacity is made to the capacity information management server 400 based on the base station identifying information, to acquire capacity information transmitted from the capacity information management server 400. That is, the capacity information acquiring unit 105 functions as the capacity information acquiring means.

The capacity information management server 400 to which an inquiry is made by the capacity information acquiring unit 105 is a device that stores information of a capacity of performing communication without occurrence of congestion in association with the base station identifying information when performing communication by the BTS 50 designated by the base station identifying information. The capacity information stored in the capacity information management server 400 is information such as a maximal call processing ability of the BTS 50, a maximal number of accommodated subscribers, and a maximal number of simultaneous connections. Further, the capacity information management server 400 has a function as a TCS (Traffic congestion Control System) that controls a communication amount to avoid congestion when concentration of communications according to the communication terminals 60 in the serving area of the specific BTS 50, for example, at the time of occurrence of a disaster or an event. Moreover, based on the base station identifying information from the capacity information acquiring unit 105, a capacity of the BTS 50 stored in association with the base station identifying information is transmitted to the capacity information acquiring unit 105. Thereby, capacity information corresponding to the base station identifying information is acquired in the capacity information acquiring unit 105, and transmitted to the information collection controlling unit 102.

By each unit functioning as described above, in the information collection controlling unit 102, the terminal information transmitted from the terminal information acquiring unit 103, the information-amount information transmitted from the information amount acquiring unit 104, and the capacity information transmitted from the capacity information acquiring unit 105 are acquired. In the information collection controlling unit 102, based on the above information, transmission timing information is created for collecting information from the communication terminals 60 existing in the serving area under the BTS 50 such that congestion does not occur in the specific BTSs 50 due to an increased communication amount. FIG. 6 shows an example of the transmission timing information created in the information collection controlling unit 102. In the transmission timing information shown in FIG. 6, the communication terminals 60 existing in the serving area of the BTS 50 are classified into five groups by use of four lower digits of phone numbers identifying the communication terminals 60. The timing (information transmission timing) at which the communication terminals 60 belonging to the respective groups transmit information to the information collection controlling system 10 based on information transmission request signals is designated in association with the respective groups. Specifically, it is shown that since the communication terminal 60 identified by a phone number with its four lower digits being, for example, "4221" belongs to a group 3, its information transmission timing is two minutes after the time point of receiving the information transmission request signal. It should be noted that, as a result of studying the possibility for occurrence of congestion based on the information transmitted from the terminal information acquiring unit 103, the information amount acquiring unit 104 and the capacity information acquiring unit 105, transmission timing information is not created or transmission timing information is created which designates the same information transmission timing to all the communication terminals 60 existing in the serving area of the BTS 50 when determination that congestion will not occur even when the communication terminals 60 existing in the serving area of the BTS 50 simultaneously transmit information.

In the information collection controlling unit 102, an information collection request signal (information transmission request signal) including the above transmission timing information is further created. This information transmission request signal includes, other than the transmission timing information, collection identifying information (base station identifying information, collected-information type, and terminal type). The information transmission request signal created by the information collection controlling unit 102 is transmitted to the transmission request delivering unit 106.

It is to be noted that, although the information collection controlling unit 102 functions as the transmission request creating means as well as functioning as the information collection controlling means as described above in the present embodiment, it can be embodied such that the function as the information collection controlling means and the function as the transmission request creating means may be performed by respectively different function units. In this case, for example, collected-information identifying information received by the input unit 101 is transmitted from the input unit 101 separately to the information collection controlling means and the transmission request creating means, and after transmission timing information is created in the information collection controlling means by use of the above information, this transmission timing information is transmitted to the transmission request creating means, and in the transmission request creating means, information transmission request is created by use of the collected-information identifying information transmitted from the input unit 101 and the transmission timing information transmitted from the information collection controlling means, and whereby the same processing as in the information collection controlling unit 102 of the present embodiment is performed.

The transmission request delivering unit 106 functions as the transmission request delivering means for delivering the information transmission request signal, transmitted from the information collection controlling unit 102, to the communication terminal 60. Specifically, the information transmission request signal is transmitted to the CBS 20, to instruct simultaneous delivery of the information transmission request signals to the communication terminals 60 existing in the serving area of the BTS 50 identified by the base station identifying information included in the information transmission request signal.

The collected information acquiring unit 107 has a function of acquiring collected information transmitted from the communication terminals 60 based on the information transmission request signals delivered from the transmission request delivering unit 106 to the communication terminals 60. The collected information acquiring unit 107 acquires collected information, and thereby, a series of processing according to the information collection performed by the information collecting device 100 is completed.

Returning to FIG. 2, the other devices included in the communication system 1 will be described. The CBS 20 has a function of transmitting the information transmission request signal transmitted from the information collecting device 100, included in the information collection controlling system 10, to the communication terminals 60 existing in the serving area of the BTS 50. Further, the SGSN 30 is a device that performs location management, security management and access control of the communication terminals with which communication is performed by connection to the mobile communication network N1 provided by the carrier N. The RNC 40 is a device that controls communication performed in the plurality of BTSs 50 connected to the RNC 40. Moreover, the BTS 50 is a device that transmits and receives information to and from the communication terminals 60 in its serving area by wireless communication.

Figure 7:
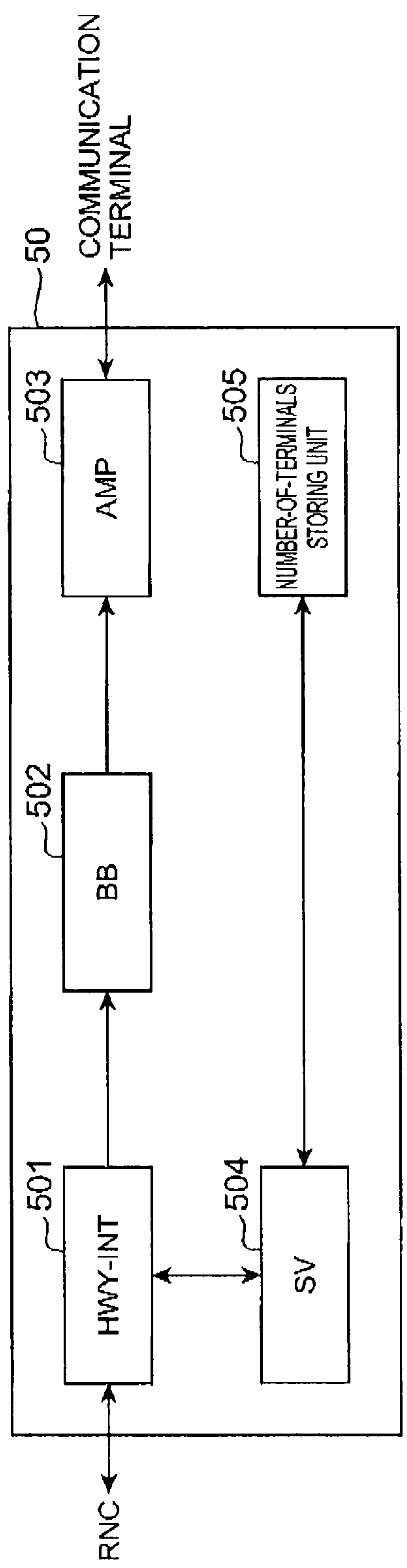
FIG. 7 is a block diagram illustrating a configuration of the BTS included in the communication system according to the first embodiment.

A configuration of the BTS 50 will be described here using FIG. 7. FIG. 7 is a block diagram illustrating the configuration of the BTS 50. As shown in FIG. 7, the BTS 50 is configured including an HWY-INT (transmission request receiving means) 501, a BB502, an AMP (information transmission request delivering means) 503, an SV 504, and a number-of-terminals storing unit (number-of-terminals holding means) 505. The HWY-INT 501 is a wired transmission path interface unit, and has a function of transmitting and receiving information to and from the RNC 40. Further, the BB502 is a base band signal processing unit. The AMP 503 is a transmission amplification unit, and has a function of transmitting and receiving information to and from the communication terminal 60. The information transmission request signal transmitted from this AMP 503 to the communication terminal 60 includes the transmission timing information, the collected-information type and the terminal type. The SV 504 is a monitor controlling unit, and has a function of measuring the number of times, a traffic amount, and the like of location registration processing performed between the communication terminal 60 in the serving area and the BTS 50, to monitor a condition of the network, and the like. Further, the number-of-terminals storing unit 505 has a function of holding the number of communication terminals 60 (number of terminals) existing in the serving area of the specific BTS 50. The number of terminals held in the number-of-terminals storing unit 505 can be calculated from the number, the traffic amount, and the like of the location registration processing monitored by the SV 504. Moreover, the number-of-terminals storing unit 505 may also have a function of transmitting information that instructs the communication terminal 60 to return a response signal from the number-of-terminals storing unit 505 to the communication terminals 60, and calculating the number of terminals from the number of response signals from the communication terminals 60.

Figure 8:
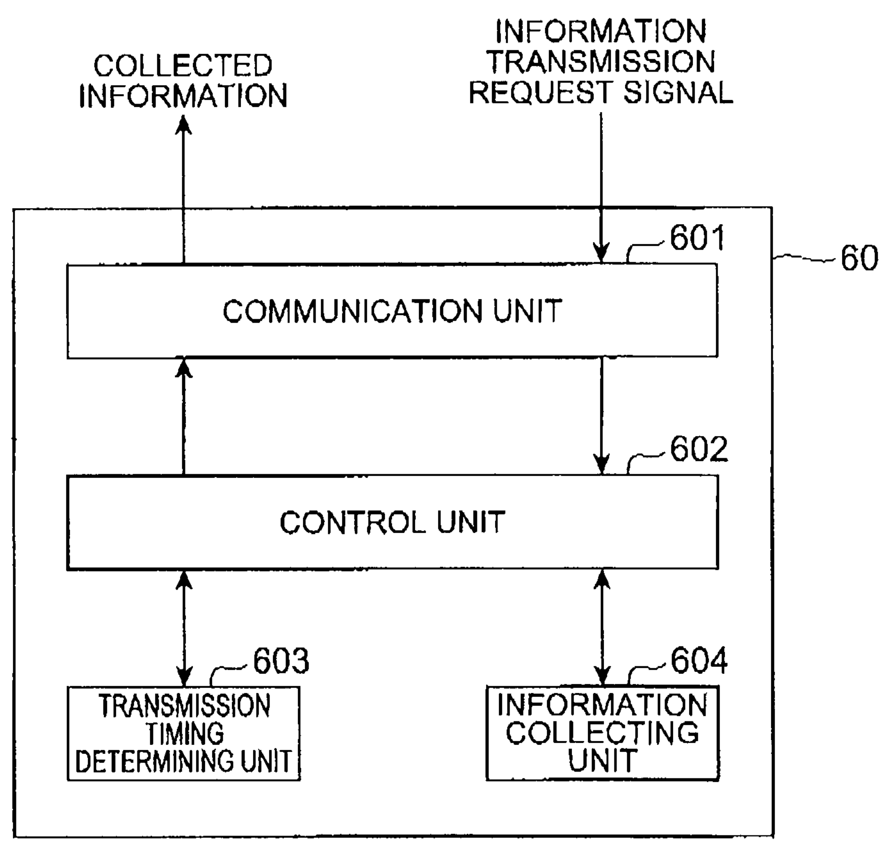
FIG. 8 is a block diagram illustrating a configuration of the communication terminal included in the communication system according to the first embodiment.

Next, the communication terminal 60 will be described using FIG. 8. The communication terminal 60 is configured including a communication unit (reception means, information transmitting means) 601, a control unit (information creating means) 602, a transmission timing determining unit (transmission timing determining means) 603, and an information collecting unit (information creating means) 604.

The communication unit 601 receives the information transmission request signal which is delivered from the BTS 50 and which includes: the transmission timing information; collected-information type; and the terminal type, while transmitting information held by the communication terminal 60 to the information collection controlling system 10. The information transmission request signal received by the communication unit 601 is transmitted to the control unit 602.

The control unit 602 refers to the terminal type out of the information included in the information transmission request signal transmitted from the communication unit 601, thereby to determine the necessity for information collection by its own terminal. When determining the necessity for information collection in its own terminal, the control unit 602 transmits the transmission timing information included in the information transmission request signal to the transmission timing determining unit 603, to instruct determination of the timing for transmitting information from its own terminal. Further, the control unit 602 transmits the collected-information type to the information collecting unit 604, to instruct collection of collected information identified by the collected-information type. Moreover, the control unit 602 has a function of instructing the communication unit 601 to transmit the collected information based on the determination result of the information transmission timing transmitted from the transmission timing determining unit 603, and collected information transmitted from the information collecting unit 604.

The transmission timing determining unit 603 has a function of determining the timing for transmitting information from its own terminal based on the transmission timing information transmitted from the control unit 602. Specifically, when the information transmission request signal including the transmission timing information shown in FIG. 6 is transmitted from the information collection controlling system 10, it is determined in the transmission timing determining unit 603 which group its own terminal belongs to based on the telephone number of its own terminal, and the information transmission timing associated with the group is transmitted to the control unit 602 as the information transmission timing of its own terminal.

The information collecting unit 604 has a function of preparing collected information to be transmitted from its own terminal to the information collection controlling system 10 based on the collected-information type transmitted from the control unit 602. For example, when the "location information" is designated as the collected-information type included in the information transmission request signal, the latitude/longitude information held in the communication terminal 60 is collected by the information collecting unit 604, and transmitted to the control unit 602.

In the communication system 1 according to the present embodiment, each of the functions described above is exerted, thereby to realize the information collecting processing according to the present embodiment.

(Information Collecting Method by Means of Communication System According to First Embodiment)

Next, an information collecting method by means of the foregoing communication system 1 will be described using sequence diagrams shown in FIGS. 9 and 10. It is to be noted that FIG. 9 is a sequence diagram illustrating processing performed by the information collecting device 100 included in the information collection controlling system 10, the subscriber information management server 200, the information amount management server 300, the capacity information management server 400, the BTS 50 and the communication terminal 60, and FIG. 10 is a sequence diagram illustrating processing performed by the communication terminal 60 in more detail.

First, as shown in FIG. 9, collected-information identifying information is received in the input unit 101 of the information collecting device 100 (S01, information receiving step). Herein, the information (collected-information identifying information) acquired by the input unit 101 includes base station identifying information, a collected-information type and a terminal type. The above information acquired by the input unit 101 is transmitted to the information collection controlling unit 102.

Next, the base station identifying information is transmitted by the information collection controlling unit 102 to the terminal information acquiring unit 103 and the capacity information acquiring unit 105, while the collected-information type is transmitted to the information amount acquiring unit 104. Based on this, the following processing are respectively performed in the terminal information acquiring unit 103, the information amount acquiring unit 104 and the capacity information acquiring unit 105.

First, in the terminal information acquiring unit 103, an inquiry about terminal information of the communication terminals 60 existing in a serving area of the BTS 50 identified by the base station identifying information is made to the subscriber information management server 200 using the base station identifying information (S02, terminal information acquiring step). Then, in the subscriber information management server 200, information of the communication terminals 60 existing in the serving area of the BTS 50, which is stored in association with the base station identifying information, is transmitted to the terminal information acquiring unit 103 as the terminal information (S03, terminal information acquiring step). It should be noted that the terminal information transmitted to the terminal information acquiring unit 103 here includes the number of communication terminals 60 existing in the serving area of the BTS 50, types of the respective communication terminals 60, and the like. In the terminal information acquiring unit 103, the terminal information transmitted from the subscriber information management server 200 is acquired by the above processing, and transmitted to the information collection controlling unit 102.

Next, in the information amount acquiring unit 104, by use of the collected-information type, an inquiry is made to the information amount management server 300 about information-amount information when the communication terminal 60 transmits information identified by the collected-information type (S04, information amount acquiring step). Then, in the information amount management server 300, information-amount information of the acquired information stored in association with the collected-information type is transmitted to the information amount acquiring unit 104 (S05, information-amount information acquiring step). In the information amount acquiring unit 104, the information-amount information transmitted from the information amount management server 300 is acquired by the above processing, and transmitted to the information collection controlling unit 102.

Next, in the capacity information acquiring unit 105, by use of the base station identifying information, an inquiry is made to the capacity information management server 400 about capacity information of communication by the BTS 50 identified by the base station identifying information (S06, capacity information acquiring step). In the capacity information management server 400, capacity information of the BTS 50 stored in association with the base station identifying information is transmitted to the capacity information acquiring unit 105 (S07, capacity information acquiring step). In the capacity information acquiring unit 105, the capacity information transmitted from the capacity information management server 400 is acquired by the above processing, and transmitted to the information collection controlling unit 102.

In addition, there is no particular restriction on the order in which the processing (S02, S03), the processing (S04, S05) and the processing (S06, S07) are performed respectively by the terminal information acquiring unit 103 the information amount acquiring unit 104, and the capacity information acquiring unit 105. That is, these processing may be performed concurrently and parallely. However, after all of these processing have been performed, the process proceeds to next processing.

Subsequently, in the information collection controlling unit 102, it is determined whether or not congestion will occur by use of the terminal information transmitted from the terminal information acquiring unit 103, the information-amount information transmitted from the information amount acquiring unit 104, and the capacity information transmitted from the capacity information acquiring unit 105 (S08). Here considered is the possibility for occurrence of congestion when the information transmission request signal is transmitted to the communication terminals 60 in the serving area of the BTS 50 causing simultaneous transmission of collected information from the communication terminals 60. Herein, when the terminal type is acquired as the collected-information identifying information as in the present embodiment, it is determined whether or not congestion will occur further by use of the number of communication terminals 60 in agreement with the terminal type. As a result of this determination, if it is determined that congestion will occur when simultaneous transmission of the collected information is made by the communication terminals 60 existing in the serving area of the BTS 50, transmission timing information is generated for allowing reception of the collected information transmitted from the communication terminals 60 without occurrence of congestion (S09, information collection controlling step). Examples of a method for generating the transmission timing information may include a method for classifying the communication terminals 60 in the serving area into a plurality of groups to designate information transmission timing different for each of the groups, as shown in FIG. 6. It is to be noted that, when it is determined that congestion will not occur in the case of simultaneous transmission of the collected information by the communication terminals 60, generation of transmission timing information in a next step (S09) is cancelled, or transmission timing information that designates the same timing to all the communication terminals 60 is generated.

Subsequently, in the information collection controlling unit 102, an information transmission request signal including this transmission timing information is created (S10, transmission request creating step). This information transmission request signal includes the collected-information type, the base station identifying information and the terminal type as the collected-information identifying information, and the transmission timing information. The information transmission request signal created by the information collection controlling unit 102 is transmitted to the transmission request delivering unit 106, and transmitted from the transmission request delivering unit 106 to the CBS 20. This information transmission request signal is transmitted to the BTS 50 identified by the base station identifying information via the CBS 20, the SGSN 30 and the RNC 40 (S11, transmission request delivering step). The information transmission request signals (information collection request signals) each including the collected-information type, the transmission timing information and the terminal type are simultaneously transmitted from the BTS 50 to the communication terminals 60 (S12, transmission request delivering step), and the information transmission request signals are received in the communication terminals 60. In the communication terminal 60, processing according to collection of information is performed (S13), and a response including the collected information is transmitted to the information collection controlling system 10 via the BTS 50 (S14).

The processing according to collection of information in the communication terminal 60 (S13) will be described here using FIG. 10. First, in the communication unit 601, the information transmission request signal simultaneously delivered from the BTS 50 (S12 of FIG. 9) is received (S101). The information transmission request signal is then transmitted from the communication unit 601 to the control unit 602 (S102).

In the control unit 602, the terminal type is referred to out of the collected-information type, the transmission timing information and the terminal type included in the information transmission request signal from the communication unit 601, and the necessity for transmitting the collected information from its own terminal to the information collection controlling system 10 is determined (S103). Herein, for example, when a model of the own terminal does not agree with a model designated in the terminal type, or when the own terminal does not have a function designated by the terminal type, transmission of the collected information is determined to be unnecessary in the control unit 602, and subsequent processing is cancelled. However, next processing is performed when the own terminal is determined to be a terminal designated by the terminal type.

That is, the transmission timing information included in the information transmission request signal is transmitted by the control unit 602 to the transmission timing determining unit 603 (S104). In the transmission timing determining unit 603, upon reception of this transmission timing information, the timing at which its own terminal should transmit the collected information is decided (S105). Specifically, the information transmission timing of the own terminal is identified from the information included in the transmission timing information, to decide the information transmission timing. The information transmission timing decided by the transmission timing determining unit 603 is transmitted from the transmission timing determining unit 603 to the control unit 602 (S106).

Further, the collected-information type included in the information transmission request signal is transmitted by the control unit 602 to the information collecting unit 604 (S107). In the information collecting unit 604, information identified by this collected-information type is collected (S108), and the collected information is transmitted to the control unit 602 as the collected information (S109).

In addition, there is no particular restriction on the order in which the processing according to the decision of the information transmission timing (S104 to S106) and the processing according to the information collection (S107 to S109) are performed, and for example, these processing may be performed parallely.

Subsequently, the information transmission timing decided by the processing according to the decision of the information transmission timing, and the collected information acquired by the processing according to the information collection are transmitted from the control unit 602 to the communication unit 601 (S110). Then, at the timing designated by the information transmission timing transmitted from the control unit 602, the collected information is transmitted by the communication unit 601 to the information collection controlling system 10 (S111). By the above processing, processing according to the information collection and the transmission of the collected information accompanied by reception of the information transmission request signal is completed. The collected information is then transmitted from the communication terminal 60 to the BTS 50 (S14) as shown in FIG. 9, and transmitted to the information collecting device 100 via each of the devices, to be acquired by the collected information acquiring unit 107 of the information collecting device 100 (S15). In the information collecting device 100, the collected information indicated by the collected-information type is received by the above processing, and processing according to the information collection is completed.

(Effect of Information Collecting System and Information Collecting Method According to First Embodiment)

Next, an effect of the information collection controlling system 10 and the information collecting processing by the information collection controlling system 10 according to the present embodiment will be described.

According to the information collecting method by means of the information collection controlling system 10, the terminal information is acquired by the terminal information acquiring unit 103 based on the base station identifying information included in the collected-information identifying information. Further, the information-amount information based on the collected-information type is acquired by the information amount acquiring unit 104. The capacity information based on the base station identifying information is acquired by the capacity information acquiring unit 105. Then, based on the above information, the transmission timing information that designates the timing at which a capacity of performing communication via the BTS 50 is not exceeded is generated in the information collection controlling unit 102, and the information transmission request signal including the transmission timing information is delivered to the communication terminal 60. In this manner, the timing at which the communication terminals 60 existing in the serving area of the BTS 50 respond to the simultaneously delivered information transmission request signals is previously designated using the transmission timing information, thereby allowing suppression of an increase in communication amount and induction of congestion caused by simultaneous reply of the communication terminals 60 in the serving area.

Further, the information collection controlling unit 102 creates the transmission timing information only when determining the necessity for creating the transmission timing information, to determine that creation of the transmission timing information is necessary due to the possibility for network congestion. With such an aspect, for example in a case where the number of existing terminals is small and network congestion will not occur even when collected information is simultaneously transmitted from the communication terminals in the serving area, the processing according to the creation of the transmission timing information can be omitted. Further, since the information transmission request signals with the transmission timing information excluded therefrom can be simultaneously delivered to the communication terminals 60, the information amount of the information transmission request signal can be made small.

Moreover, in the above embodiment, the terminal type is received in the input unit 101. The terminal type is made included in the information transmission request signal transmitted from the information collecting system 2, which is simultaneously transmitted to the communication terminals 60, and on the communication terminal 60 side, the necessity for transmission of collected information from its own terminal is determined, and the information is collected and transmitted only when the transmission is determined to be necessary. With such an aspect, the information transmission request signals are simultaneously transmitted to the communication terminals 60 in the serving area, whereas, for example, collected information is not transmitted from the communication terminal 60 not holding information identified by the collected-information type included in the information transmission request signal, and hence occurrence of unnecessary communication can be suppressed, thereby to suppress occurrence of network congestion, while information is efficiently collected in the information collecting system 2.

Moreover, when the terminal type is received in the input unit 101 as the collected information identifying information, in the information collection controlling unit 102, the necessity for creating transmission timing information is determined by use of this terminal type, and hence the necessity for creating the transmission timing information is determined with higher accuracy.

Second Embodiment

Configuration of Communication System According to Second Embodiment

Subsequently, a second embodiment as a preferred embodiment of the present invention will be described. The communication system according to the second embodiment is different from the first embodiment in the following respect. That is, in the first embodiment, acquisition of the terminal information according to the communication terminals existing in the serving area of the BTS 50 identified by the base station identifying information and acquisition of the capacity information of the BTS 50 have been performed by the information collecting device 100, and generation of the transmission timing information based on the above information and the information-amount information has been performed by the information collection controlling unit 102 of the information collecting device 100. However, in the second embodiment, acquisition of terminal information and acquisition of capacity information of the BTS 50 are performed by the BTS 50, and determination according to occurrence or non-occurrence of congestion and generation of transmission timing information are performed in the BTS 50. In the following, the communication system according to the second embodiment will be described with a focus on the different respect from the first embodiment.

FIG. 11 is a diagram illustrating a configuration of the information collection controlling system 10 (information collection controlling system 10A) according to the second embodiment. As shown in FIG. 11, in the information collection controlling system 10A according to the second embodiment, the terminal information acquiring unit 103 and the capacity information acquiring unit 105 are eliminated in an information collecting device 100A, as compared with the respective configurations included in the information collection controlling system 10 according to the first embodiment. Further, the information amount management server 300 for which terminal information is acquired by the terminal information acquiring unit 103, and the capacity information management server 400 for which capacity information is acquired by the capacity information acquiring unit 105 are also eliminated from the information collection controlling system 10A.

In the above information collection controlling system 10A, out of base station identifying information, a collected-information type and a terminal type included in collected-information identifying information received by the input unit 101, it is only the collected-information type that is used by the information collection controlling unit 102. Specifically, in the information collection controlling unit 102, the collected-information type is transmitted to the information amount acquiring unit 104, thereby to instruct acquisition of information-amount information corresponding to the collected-information type. Based on this instruction, an inquiry is made to the capacity information management server 400 in the information amount acquiring unit 104, and the information-amount information is thereby acquired, which is then transmitted from the information amount acquiring unit 104 to the information collection controlling unit 102. In the information collection controlling unit 102, when the information-amount information transmitted from the information amount acquiring unit 104 is acquired, an information transmission request signal is created which includes the base station identifying information, the collected-information type, the communication terminal type and the information-amount information.

This information transmission request signal is transmitted from the transmission request delivering unit 106 to the CBS 20, and is thereby transmitted to the BTS 50 (BTS 50A) identified by the base station identifying information via the SGSN 30 and the RNC 40 included in the information collecting system 2. That is, the transmission request delivering unit 106 functions as the transmission request transmitting means.

Figure 12:
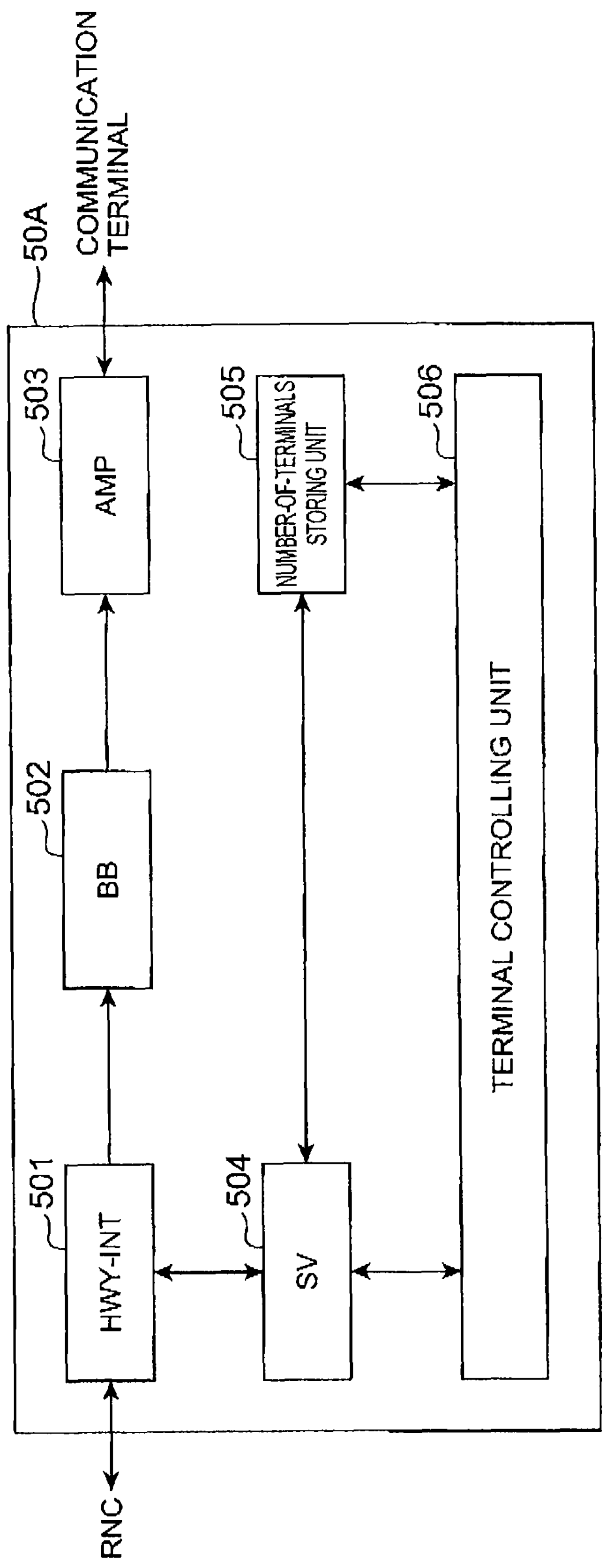
FIG. 12 is a block diagram illustrating a configuration of a BTS included in the communication system according to the second embodiment.

FIG. 12 is a diagram illustrating a configuration of the BTS 50A according to the second embodiment. As shown in FIG. 12, in the BTS 50A according to the second embodiment, the configuration of the BTS 50 according to the first embodiment is totally provided, while a terminal controlling unit (transmission timing information generating means) 506 is provided which performs determination according to occurrence or non-occurrence of congestion, and generation of transmission timing information.

In the BTS 50A according to the second embodiment, the information transmission request signal transmitted from the information collection controlling system 10A is received in the HWY-INT 501, and this information transmission request signal is transmitted to the terminal controlling unit 506 via the SV 504.

Upon reception of the information transmission request signal from the information collection controlling system 10A, the terminal controlling unit 506 makes an inquiry to the number-of-terminals storing unit 505 about information of the number of terminals, thereby to acquire information according to the number of communication terminals 60 existing in a serving area of its own device.

Further, in the terminal controlling unit 506, information according to a capacity of its own device (capacity information) is held. Based on the number of terminals transmitted from the number-of-terminals storing unit 505, the information amount included in the information transmission request signal and the capacity information held in the terminal controlling unit 506, determination is made on the possibility for occurrence of network congestion due to responses to the information transmission request signals from the communication terminals 60 in the case of simultaneous delivery of the information transmission request signals to the communication terminals 60. When it is considered that network congestion will occur, transmission timing information for avoiding network congestion is generated. In this manner, the terminal controlling unit 506 functions as the transmission timing information generating means. The transmission timing information generated by the terminal controlling unit 506 is transmitted to the AMP 503 along with the information transmission request signal, and simultaneously delivered from the AMP 503 to the communication terminals 60. That is, in the information collecting system 2 according to the present embodiment, the AMP 503 of the BTS 50 functions as the information transmission request delivering means. In addition, when it is determined in the terminal controlling unit 506 that congestion will not occur when the collected information is simultaneously transmitted from the communication terminals 60, generation of the transmission timing information is cancelled, or transmission timing information that designates the same timing to all the communication terminals 60 is generated.

(Information Collecting Method by Means of Communication System According to Second Embodiment)

Next, an information collecting method by means of the communication system 1 according to the second embodiment will be described using a sequence diagram shown in FIG. 13. It should be noted that, since processing in the communication terminal 60 is similar to that in the first embodiment, the description thereof is omitted.

First, as shown in FIG. 13, collected-information identifying information is received in the input unit 101 of the information collecting device 100 (S21, information receiving step). Herein, the information (collected-information identifying information) acquired by the input unit 101 includes base station identifying information, a collected-information type and a terminal type. The above information received by the input unit 101 is transmitted to the information collection controlling unit 102.

Next, the collected-information type included in the collected information identifying information is transmitted by the information collection controlling unit 102 to the information amount acquiring unit 104. In the information amount acquiring unit 104, by use of the collected-information type, an inquiry is made to the information amount management server 300 about information-amount information when information identified by the collected-information type is transmitted from the communication terminal 60 (S22, information amount acquiring step). Then, in the information amount management server 300, information-amount information of the acquired information stored in association with the collected-information type is transmitted to the information amount acquiring unit 104 (S23, information amount acquiring step). In the information amount acquiring unit 104, the information-amount information transmitted from the information amount management server 300 is acquired by the above processing, and transmitted to the information collection controlling unit 102.

In the information collection controlling unit 102, the information transmission request signal is created which includes the information-amount information transmitted from the information amount acquiring unit 104 and the base station identifying information, the collected-information type and the terminal type included in the collected-information identifying information. This information transmission request signal is then transmitted from the information collection controlling unit 102 to the transmission request delivering unit 106, and transmitted from the transmission request delivering unit 106 to the CBS 20 (transmission request transmitting step). This information transmission request signal is then transmitted to the BTS 50 identified by the base station identifying information via the CBS 20, the SGSN 30 and the RNC 40 (S24, transmission request transmitting step).

In the BTS 50A, the information transmission request signal is received in the HWY-INT 501 (transmission request receiving step), and transmitted to the terminal controlling unit 506 via the SV 504. The number of communication terminals 60 existing in the serving area of its own device is acquired by the terminal controlling unit 506 from the number-of-terminals storing unit 505, and based on this number of terminals and the information-amount information included in the information transmission request signal, the possibility for network congestion is determined (S25). When it is determined that congestion might occur, the transmission timing information is generated (S26, transmission timing information generating step). Then, the information transmission request signal including the transmission timing information for simultaneous delivery to the communication terminals 60 is created (S27), and transmitted from the terminal controlling unit 506 to the AMP 503 via the SV 504, the HWY-INT 501 and the BB502. The signals are then simultaneously delivered from the AMP 503 to the communication terminals 60 existing in the serving area (S28, information transmission request delivering step). Thereby, the information transmission request signals are simultaneously delivered to the communication terminals 60.

In the communication terminal 60, collection information is created in a similar manner to the information collecting method according to the first embodiment (S29), and at information transmission timing designated by the transmission timing information, the collected information is transmitted from the communication terminal 60 to the information collecting device 100A, and acquired by the collected information acquiring unit 107 of the information collecting device 100A (S30, S31). Thereby, the processing according to the information collection in the information collecting device 100A is completed.

(Effect of the Information Collecting System and Information Collecting Method According to Second Embodiment)

Next, an effect of the information collecting system 2 and the information collecting processing by the information collection controlling system 2 according to the present embodiment will be described.

Acquisition of the terminal information and the capacity information, determination according to occurrence of network congestion by use of the above information, and generation of transmission timing information based on a result of this determination, which have been performed in the information collecting device 100 in the information collecting method according to the first embodiment, are performed in the BTS 50A in the information collecting method by means of the information collection controlling system 2 according to the present embodiment. Therefore, taking an aspect of generating transmission timing information in the BTS 50A can reduce the number of processing in the information collecting device 100. Further, since information of the number of communication terminals 60 existing in the serving area of its own device, and the like is information having conventionally been stored in the BTS 50A, processing according to generation of the transmission timing information is efficiently performed by use of the above information.

<Example of Usage of Information Collecting System>

Next, an example of usage of the information collecting system and the information collecting method according to the first embodiment or the second embodiment will be described using FIG. 14.

Figure 14:
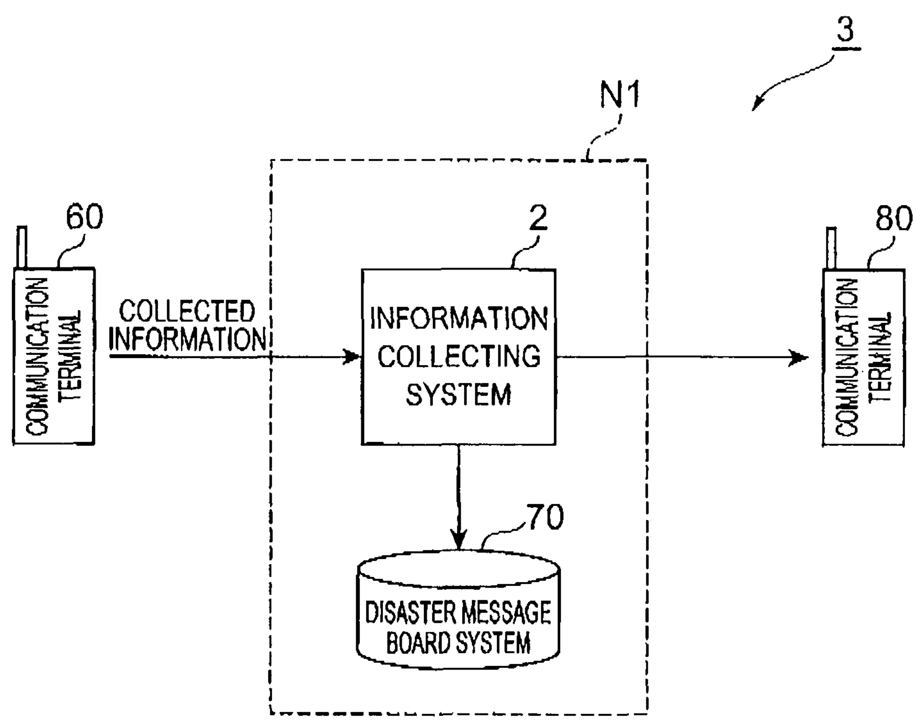
FIG. 14 is a diagram showing a configuration of a communication system including the information collecting system according to the first and second embodiments.

FIG. 14 is a diagram showing a configuration of a communication system 3 including the information collecting system 2 according to the above embodiments. As shown in FIG. 14, the information collecting system 2 included in the communication system 3 is configured being connected with a disaster message board system 70 which is included in the same mobile communication network N1 as is the information collecting system 2.

The disaster message board system 70 is a conventionally operated system as a system capable of checking a disaster situation and the like of a user of a communication terminal existing in a disaster occurrence area at the time of occurrence of the disaster or the like by the user operating the communication terminal and writing a disaster situation of the user, and by a third person browsing the message board system.

A communication terminal 80 is a communication terminal used by the user, as is the communication terminal 60. The communication terminal 60 and the communication terminal 80 are previously registered in the information collecting system 2 as group terminals belonging to the same group, for example, in accordance with a family contract, group registering, or the like.

In such a communication system 3, for example at the time of delivering an "earthquake early warning" issued by the Japan Meteorological Agency or an emergency information provided by a municipality due to occurrence of an earthquake or the like, to the communication terminals 60 existing in a serving area of the BTS 50 in a corresponding area (e.g. disaster area), an information transmission request signal that designates "location information" as the collected-information type of the communication terminal 60 is delivered together through use of the information collecting system 2. The communication terminal 60 then notifies the user of the delivered emergency information for example by displaying it on a screen, while transmitting the location information of the communication terminal 60 as collected information to the information collecting system 2 in response to the information transmission request signal. Thus, the location information of the communication terminal 60 is acquired in the information collecting system 2.

By the information collecting system 2 transmitting to the disaster message board system 70 the location information acquired from the communication terminal 60, the location information of the communication terminal 60 is written into the disaster message board system 70. Thereby, the third person can acquire the information of the communication terminal 60 existing in the disaster area by making a search in the disaster message board system 70. Along therewith, in the information collecting system 2, an aspect is taken where the information is transmitted to the communication terminal 80 as the group terminal in the case of acquiring the location information from the communication terminal 60, and hence in the communication terminal 80 as the group terminal of the communication terminal 60, the information of the communication terminal 60 being existing in the disaster area is notified from the information collecting system 2.

As thus described, information collected from the communication terminal 60 through use of the information collecting system 2 according to the first embodiment or the second embodiment can be cooperated with the disaster message board system 70 so as to be utilized for notification of a disaster situation and the like.

It is to be noted that in the case of using the information collecting system 2 according to the first embodiment in cooperation with the disaster message board system 70 as described above, an aspect can be taken where, at the time of acquiring the terminal information from the subscriber information management server 200 based on the base station identifying information included in the collected-information identifying information acquired in the information collecting device 100, information of a list of communication terminals existing in the serving area of the specific BTS 50 is acquired as the terminal information, and the information is transmitted to the disaster message board system 70, to be written as "communication terminals that might exist in the disaster area" into the disaster message board system 70.

Modified Examples

Although preferred embodiments of the present invention have been described above, the information collecting system, the information collecting device, the communication terminal and the information collecting method according to the present invention are not restricted to the above embodiments, and a variety of aspects can be taken.

For example, in the present embodiments, the case has been described where the communication terminals existing in the serving area of the BTS 50 are classified into a plurality of groups and the timing for information transmission performed by the communication terminals belonging to each group are individually designated as the transmission timing information. However, transmission timing information that designates a time width as described above can also be used as the transmission timing information. In this case, in the communication terminal 60, the timing at which collected information is transmitted from its own terminal is decided by use of random number processing or the like within the time width, and the collected information is transmitted from the communication terminal 60 to the information collecting system 2 at the timing. It is to be noted that in the case of using this aspect, when an amount of communication by transmission of the collected information is large, a larger time width is preferably designated.

Further, the first embodiment and the second embodiment can be combined with each other as appropriate. For example, although terminal information is not acquired from the subscriber information management server 200 in the second embodiment, an aspect can also be taken where terminal information is acquired from the subscriber information management server 200 and transmitted to the BTS 50 as in the first embodiment, and hence the terminal information can be utilized at the time of determination according to network congestion and generation of transmission timing information in the BTS 50. Moreover, an aspect can also be taken where both the information-amount information and the capacity information are acquired in the information collecting device 100, which are transmitted to the BTS 50, to be combined with the number of terminals information held in the BTS 50, and determination according to network congestion is performed.

It is to be noted that, although the case of the terminal type being included in the collected-information identifying information has been described in the above embodiments, the terminal type is not information necessarily included in the collected-information identifying information. That is, even in the case of the terminal type not being included in the collected-information identifying information, the transmission timing information can be generated in the information collecting device 100 or the BTS 50, which enables to collect information from the communication terminals 60 without occurrence of network congestion.

INDUSTRIAL APPLICABILITY

The present invention provides an information collecting system, a communication terminal and an information collecting method, which are capable of delivering information transmission requests to communication terminals existing in a specific area, to collect information held in the communication terminals, without inducing congestion.

REFERENCE SIGNS LIST

1, 3 communication system
2 information collecting system
10 information collection controlling system
20 CBS
30 SGSN

40 RNC
50 BTS
60, 80 communication terminal
70 disaster message board system
100 information collecting device
200 subscriber information management server
300 information amount management server
400 capacity information management server

The invention claimed is:

1. An information collecting system which collects collected information as information held in a plurality of communication terminals existing in a serving area under a specific base station via a mobile communication network, the system comprising:

an information receiving unit for receiving base station identifying information as information identifying the base station, and a collected-information type as information identifying the type of the collected information;

a terminal information acquiring unit for acquiring terminal information that includes information representing the number of communication terminals for which the collected information is collected, based on the base station identifying information;

an information amount acquiring unit for acquiring information-amount information according to an information amount of information identified by the collected-information type, based on the collected-information type;

a capacity information acquiring unit for acquiring capacity information as information according to a capacity of performing communication via the base station, based on the base station identifying information;

an information collection controlling unit for generating transmission timing information that designates the timing at which the plurality of communication terminals transmits the collected information, based on the terminal information, the information-amount information and the capacity information;

a transmission request creating unit for creating an information transmission request that includes the transmission timing information and the collected-information type; and a transmission request delivering unit for delivering the information transmission requests to the plurality of communication terminals.

2. The information collecting system according to claim 1, wherein the information receiving unit further acquires a terminal type as information identifying a type of the communication terminal that collects the collected information;

the information collection controlling unit generates the transmission timing information based on the terminal information, the information-amount information, the capacity information and the terminal type; and the transmission request creating unit creates an information transmission request including the transmission timing information, the terminal type and the collected-information type.

3. The information collecting system according to claim 1, wherein, the information collection controlling unit:

determines, based on the terminal information, the information-amount information and the capacity information, whether or not communication beyond the capacity will occur when the plurality of communication terminals simultaneously transmits the collected information to the information collecting system; and generates the transmission timing information when determining that the capacity will be exceeded, while stopping generation of the transmission timing information when determining that the capacity will not be exceeded, and wherein the transmission request creating unit eliminates the transmission timing information from the information transmission request when the information collection controlling unit determines that the capacity will not be exceeded.

4. The information collecting system according to claim 1, wherein the transmission timing information is information that designates a different timing for each of a plurality of groups into which the plurality of communication terminals is sorted using the information respectively identifying the plurality of communication terminals.

5. The information collecting system according to claim 1, wherein the transmission timing information is information that designates, by an arbitrary time width, the timing at which the plurality of communication terminals transmits the collected information.

6. The information collecting system according to claim 1, further comprising a base station, wherein the base station includes a number-of-terminals information holding unit for holding number-of-terminals information indicating the number of communication terminals existing in a serving area under its own station, to transmit the number-of-terminals information according to a number-of-terminals transmission request from the terminal information acquiring unit that requests transmission of the number-of-terminals information, and the terminal information acquiring unit transmits the number-of-terminals transmission request to the base station identified by the base station identifying information, thereby to acquire the number-of-terminals information transmitted from the base station as the terminal information.

7. The information collecting system according to claim 6, further comprising:

a terminal information storage device that stores the base station identifying information and the terminal information in association with each other;

an information-amount information storage device that stores the collected-information type and the information-amount information in association with each other; and a capacity information storage device that stores the base station identifying information and the capacity information in association with each other, wherein the terminal information acquiring unit acquires the terminal information from the terminal information storage device, the information amount acquiring unit acquires the information-amount information from the information-amount information storage device, and the capacity information acquiring means acquires the capacity information from the capacity information storage device.

8. An information collecting system, comprising a specific base station and an information collecting device that collects collected information as information held in a plurality of communication terminals existing in a serving area under the base station via a mobile communication network, wherein the information collecting device includes:

an information receiving unit for receiving base station identifying information as information identifying the base station, and a collected-information type as information identifying the type of the collected information;

an information amount acquiring unit for acquiring information-amount information according to an information amount of information identified by the collected-information type, based on the collected-information type;

a transmission request creating unit for creating an information transmission request that includes the information-amount information and the collected-information type; and a transmission request transmitting unit for transmitting the information transmission request to the base station, and wherein the base station includes:

a transmission request receiving unit for receiving the information transmission request transmitted from the information collecting device;

a number-of-terminals information holding unit for holding number-of-terminals information indicating the number of communication terminals existing in a serving area under its own station;

a transmission timing information generating unit which determines, based on the information-amount information included in the information transmission request and the number-of-terminals information held by the number-of-terminals information holding unit, whether or not communication beyond the capacity will occur when the plurality of communication terminals simultaneously transmits the collected information to the information collecting device, and which generates the transmission timing information when determining that the capacity will be exceeded, and stops generation of the transmission timing information when determining that the capacity will not be exceeded; and an information transmission request delivering unit for delivering the information transmission requests attached with the transmission timing information to the plurality of communication terminals.

9. The information collecting system according to claim 8, further comprising an information-amount information storage device that stores the collected-information type and the information-amount information in association with each other, wherein the information amount acquiring unit acquires the information-amount information from the information-amount information storage device.

10. An information collecting method by an information collecting system which collects collected information held in a plurality of communication terminals existing in a serving area under a specific base station via a mobile communication network, the method comprising:

an information receiving step in which an information receiving unit of the information collecting system receives base station identifying information as information identifying the base station, and a collected-information type as information identifying the type of the collected information;

a terminal information acquiring step in which a terminal information acquiring unit of the information collecting system acquires terminal information that includes information representing the number of communication terminals for which the collected information is collected, based on the base station identifying information;

an information amount acquiring step in which an information amount acquiring unit of the information collecting system acquires information-amount information according to an information amount of information identified by the collected-information type, based on the collected-information type;

a capacity information acquiring step in which a capacity information acquiring unit of the information collecting system acquires capacity information as information according to a capacity of performing communication via the base station, based on the base station identifying information;

an information collection controlling step in which an information collection controlling unit of the information collecting system generates transmission timing information that designates the timing at which the plurality of communication terminals transmits the collected information, based on the terminal information, the information-amount information and the capacity information;

a transmission request creating step in which a transmission request creating unit of the information collecting system creates an information transmission request that includes the transmission timing information and the collected-information type; and a transmission request delivering step in which a transmission request delivering unit of the information collecting system delivers the information transmission requests to the plurality of communication terminals.

* * * * *